(12) United States Patent
Sano et al.

(10) Patent No.: US 10,652,476 B2
(45) Date of Patent: May 12, 2020

(54) SOLID-STATE IMAGE PICKUP ELEMENT, IMAGE PICKUP APPARATUS, AND CONTROL METHOD OF SOLID-STATE IMAGE PICKUP ELEMENT

(71) Applicant: SONY CORPORATION, Tokyo (JP)

(72) Inventors: Kenichi Sano, Kanagawa (JP);
Fumihito Yasuma, Kanagawa (JP);
Ryo Hirono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/314,548

(22) PCT Filed: Mar. 31, 2017

(86) PCT No.: PCT/JP2017/013518
§ 371 (c)(1),
(2) Date: Dec. 31, 2018

(87) PCT Pub. No.: WO2018/012051
PCT Pub. Date: Jan. 18, 2018

(65) Prior Publication Data
US 2019/0364188 A1 Nov. 28, 2019

(30) Foreign Application Priority Data
Jul. 13, 2016 (JP) ................. 2016-138087

(51) Int. Cl.
*H04N 5/235* (2006.01)
*H04N 5/355* (2011.01)
*H04N 5/374* (2011.01)

(52) U.S. Cl.
CPC ....... *H04N 5/2353* (2013.01); *H04N 5/35581* (2013.01); *H04N 5/3742* (2013.01)

(58) Field of Classification Search
CPC ............. H04N 5/2353; H04N 5/35581; H04N 5/3742; H04N 5/355; H04N 5/235
See application file for complete search history.

(56) References Cited

U.S. PATENT DOCUMENTS

2009/0273695 A1* 11/2009 Mabuchi ............... H03M 1/186
348/300
2014/0022401 A1 1/2014 Awatani
(Continued)

FOREIGN PATENT DOCUMENTS

JP 2008-167004 A 7/2008
JP 2014-022931 A 2/2014
(Continued)

OTHER PUBLICATIONS

International Search Report and Written Opinion of PCT Application No. PCT/JP2017/013518, dated Jun. 13, 2017, 09 pages of ISRWO.

*Primary Examiner* — Mekonnen D Dagnew
(74) *Attorney, Agent, or Firm* — Chip Law Group

(57) ABSTRACT

To prolong an exposure time in an image pickup apparatus that combines a plurality of images. A gain processing unit increases or decreases a plurality of image signals using gains different from each other. An analog to digital conversion unit generates a plurality of image data by performing analog to digital conversion on the increased or decreased plurality of image signals. A calculation unit adds data obtained by multiplying short-time exposure data being any of the plurality of image data, by a ratio between the gains, and data among the plurality of image data that does not correspond to the short-time exposure data, and outputs the added data as long-time exposure data. A combining unit combines the short-time exposure data and the long-time exposure data at a predetermined combining ratio.

9 Claims, 22 Drawing Sheets

(56) References Cited

U.S. PATENT DOCUMENTS

| | | | | |
|---|---|---|---|---|
| 2015/0296116 A1* | 10/2015 | Tsuzuki | ............... | H04N 5/2355 348/208.1 |
| 2016/0050381 A1* | 2/2016 | Onishi | ................... | H04N 5/355 348/300 |
| 2018/0184018 A1* | 6/2018 | Itano | .................... | H04N 5/2352 |

FOREIGN PATENT DOCUMENTS

| | | | |
|---|---|---|---|
| JP | 2014-039170 | A | 2/2014 |
| JP | 2016-053849 | A | 4/2016 |
| WO | 2014/027511 | A1 | 2/2014 |
| WO | 2016/035570 | A1 | 3/2016 |

\* cited by examiner

SOLID-STATE IMAGE PICKUP ELEMENT, IMAGE PICKUP APPARATUS, AND CONTROL METHOD OF SOLID-STATE IMAGE PICKUP ELEMENT

CROSS REFERENCE TO RELATED APPLICATIONS

This application is a U.S. National Phase of International Patent Application No. PCT/JP2017/013518 filed on Mar. 31, 2017, which claims priority benefit of Japanese Patent Application No. JP 2016-138087 filed in the Japan Patent Office on Jul. 13, 2016. Each of the above-referenced applications is hereby incorporated herein by reference in its entirety.

TECHNICAL FIELD

The present technology relates to a solid-state image pickup element, an image pickup apparatus, and a control method of a solid-state image pickup element. More specifically, the present technology relates to a solid-state image pickup element, an image pickup apparatus, and a control method of a solid-state image pickup element that combine a plurality of image data.

BACKGROUND ART

Conventionally, in an image pickup apparatus, an image composition technology called high dynamic range (HDR) composition has been used for realizing a dynamic range wider than usual. For example, there is proposed an image pickup apparatus that picks up an image by exposure having a relatively-longer exposure time, and then, picks up an image by exposure having a relatively-shorter exposure time, and combines these images (e.g. refer to Patent Literature 1.).

CITATION LIST

Patent Literature

Patent Literature 1: JP 2009-88927A

DISCLOSURE OF INVENTION

Technical Problem

In the above-described conventional technology, in a case where a peripheral light amount obtained at the time of image pickup is small, and a combined image with sufficient brightness cannot be obtained even if an aperture value is adjusted, it is necessary to prolong an exposure time. Nevertheless, in the above-described conventional technology, when a plurality of combined images are picked up at regular image pickup intervals, an exposure time that is equal to or longer than the image pickup interval cannot be set. In addition, even when only one combined image is to be picked up, if an exposure time is prolonged too much, there is concern that blurring is generated when a subject moves, and image quality declines. In this manner, in the above-described image pickup apparatus, there is such a problem that it is difficult to prolong an exposure time.

The present technology has been devised in view of such a situation, and the object of the present technology is to prolong an exposure time in an image pickup apparatus that combines a plurality of images.

Solution to Problem

The present technology has been devised to solve the problem described above, a first aspect thereof is a solid-state image pickup element including: a gain processing unit configured to increase or decrease a plurality of image signals using gains different from each other; an analog to digital conversion unit configured to generate a plurality of image data by performing analog to digital conversion on the increased or decreased plurality of image signals; a calculation unit configured to add data obtained by multiplying short-time exposure data being any of the plurality of image data, by a ratio between the gains, and data among the plurality of image data that does not correspond to the short-time exposure data, and output the added data as long-time exposure data; and a combining unit configured to combine the short-time exposure data and the long-time exposure data at a predetermined combining ratio, and a control method thereof. This causes such an operation that the data obtained by multiplying the short-time exposure data by the ratio between the gains, and the data that does not correspond to the short-time exposure data are added.

In addition, according to this first aspect, a pixel array unit provided with a predetermined number of lines each including a plurality of pixels arrayed in a predetermined direction may be further included. The gain processing unit may include a first amplifier configured to increase or decrease a pixel signal from a specific line among the predetermined number of lines, using a first gain, and a second amplifier configured to increase or decrease a pixel signal from a line among the predetermined number of lines that does not correspond to the specific line, using a second gain. This causes such an operation that the image signal of the specific line and image signals of the other lines are increased and decreased using the first and second gains.

In addition, according to this first aspect, the analog to digital conversion unit may include a first analog to digital converter configured to generate first pixel data by performing analog to digital conversion on the pixel signal increased or decreased by the first amplifier, and a second analog to digital converter configured to generate second pixel data by performing analog to digital conversion on the pixel signal increased or decreased by the second amplifier. This causes such an operation that the first and second pixel data are generated.

In addition, according to this first aspect, a driver configured to sequentially drive the predetermined number of lines to cause the pixel signal to be output, when a first exposure end time elapses, and to sequentially drive the predetermined number of lines to cause the pixel signal to be output, when a second exposure end time that is earlier than completion of an output of the predetermined number of lines elapses may be further included. This causes such an operation that, before the output of the above-described predetermined number of lines is completed, these lines are sequentially driven.

In addition, according to this first aspect, the plurality of image signals may include first and second image signals. The gain processing unit may increase or decrease the first image signal using a first gain, and increase or decrease the second image signal using a second gain. The analog to digital conversion unit may generate first and second image data by performing analog to digital conversion on the first and second image signals. The calculation unit may add data obtained by multiplying the short-time exposure data by a ratio of the second gain with respect to the first gain, using the second image data as the short-time exposure data, and the first image data, and output the added data as the long-time exposure data. This causes such an operation that the data obtained by multiplying the short-time exposure data by the ratio of the second gain with respect to the first gain, and the first image data are added.

In addition, in the first aspect, the above-described plurality of image signals include image signals larger in number than two, the above-described combining unit combines a predetermined number of the above-described long-time exposure data and the above-described short-time exposure data, the predetermined number being smaller by one than the number of the above-described plurality of image signals, and the above-described calculation unit may perform, the above-described predetermined number of times, a process of adding data obtained by multiplying the above-described short-time exposure data by a ratio of the above-described second gain with respect to the above-described first gain, using the above-described second image data as the above-described short-time exposure data, and the above-described first image data, and outputting the added data as the above-described long-time exposure. This causes such an operation that data obtained by multiplying any of a certain number of the above-described image data by the above-described ratio between gains, and data obtained by multiplying remaining image data of the certain number of image data by the above-described ratio between gains are added.

In addition, according to this first aspect, the calculation unit may include a multiplication unit configured to multiply each piece of the plurality of image data by a predetermined value, and a long-time data calculation unit configured to add data obtained by multiplying the multiplied short-time exposure data by the ratio between the gains, and data among the multiplied plurality of image data that does not correspond to the short-time exposure data, and output the added data as the long-time exposure data. This causes such an operation that each of the plurality of image data is multiplied by a predetermined value.

In addition, a second aspect of the present technology is an image pickup apparatus including: a gain processing unit configured to increase or decrease a plurality of image signals using gains different from each other; an analog to digital conversion unit configured to generate a plurality of image data by performing analog to digital conversion on the increased or decreased plurality of image signals; a calculation unit configured to add data obtained by multiplying short-time exposure data being any of the plurality of image data, by a ratio between the gains, and data among the plurality of image data that does not correspond to the short-time exposure data, and output the added data as long-time exposure data; a combining unit configured to combine the short-time exposure data and the long-time exposure data at a predetermined combining ratio, and output the added data as a combined frame; and a digital signal processing unit configured to execute predetermined digital signal processing on the combined frame. This causes such an operation that the data obtained by multiplying the short-time exposure data by the ratio between the gains, and the data that does not correspond to the short-time exposure data are added, and the predetermined digital signal processing is executed on the combined frame.

Advantageous Effects of Invention

According to the present technology, in an image pickup apparatus that combines a plurality of images, such an excellent effect that an exposure time can be prolonged can be caused. Note that the effects described here are not always limited, and any of the effects described in the present disclosure may be caused.

MODE(S) FOR CARRYING OUT THE INVENTION

Hereinafter, a mode for carrying out the present technology (hereinafter, referred to as an embodiment) will be described. The description will be given in the following order.

1. First Embodiment (example of adding two frames after multiplying a gain ratio)

2. Second Embodiment (example of adding three of more frames after multiplying a gain ratio)

1. First Embodiment

[Configuration Example of Image Pickup Apparatus]

Figure 1:
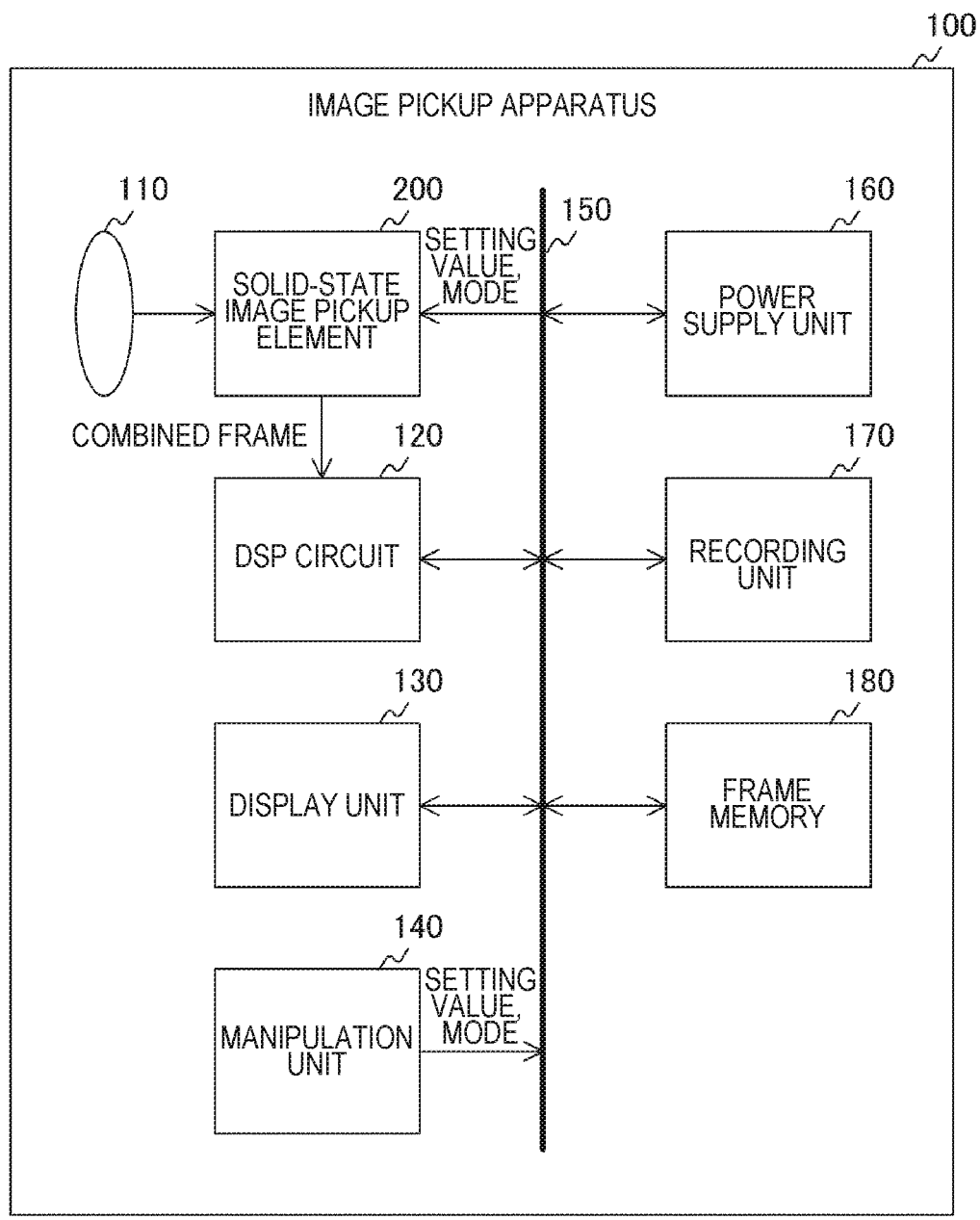
FIG. 1 is a block diagram depicting a configuration example of an image pickup apparatus in a first embodiment of the present technology.

FIG. 1 is a block diagram depicting a configuration example of an image pickup apparatus 100 in the first embodiment. The image pickup apparatus 100 includes an optical unit 110, a solid-state image pickup element 200, a digital signal processing (DSP) circuit 120, a display unit 130, a manipulation unit 140, a bus 150, a power supply unit 160, a recording unit 170, and a frame memory 180.

The optical unit 110 condenses incident light from a subject, and guides the incident light to the solid-state image pickup element 200. The optical unit 110 includes, for example, a plurality of lenses, a diaphragm, a shutter, and the like.

The solid-state image pickup element 200 picks up image data by photoelectrically converting the incident light. The solid-state image pickup element 200 operates in either operation mode of a frame addition mode and a frame non-addition mode. Here, the frame addition mode is a mode in which a plurality of image data (frames) are added, and the frame non-addition mode is a mode in which frames are not added. In the frame addition mode, the solid-state image pickup element 200 adds a plurality of frames, and generates a combined frame by combining the added data and frames before addition. On the other hand, in the frame non-addition mode, the solid-state image pickup element 200 generates a combined frame by combining a plurality of frames.

In addition, when generating image data, the solid-state image pickup element 200 increases or decreases an analog pixel signal generated by photoelectric conversion, using a set gain.

The DSP circuit 120 executes predetermined digital signal processing on a combined frame from the solid-state image pickup element 200. For example, various types of digital signal processing including a demosaic process, a white balance process, a filter process, and the like are executed. In these processes, the DSP circuit 120 holds a combined frame in the frame memory 180 as necessary. Then, the DSP circuit 120 outputs the processed combined frame to the display unit 130 and the recording unit 170. Note that the DSP circuit 120 is an example of a digital signal processing unit described in the appended claims.

The display unit 130 displays a combined frame, a manipulation screen, and the like. The manipulation unit 140 generates a manipulation signal in accordance with a manipulation of a user. In accordance with the manipulation signal, various types of setting values are set in the solid-state image pickup element 200. The setting values include an exposure ratio, a gain, an operation mode, a combining ratio, and the like. Here, the exposure ratio is a ratio between respective exposure times of two frames to be combined. In addition, the gain is an increase-decrease ratio at which a pixel signal of a pixel in the solid-state image pickup element 200 is increased or decreased.

Note that all of the exposure ratio, the gain, the operation mode, and the combining ratio are set by the user, but a part of these may be set by the DSP circuit 120 or the solid-state image pickup element 200 itself.

The bus 150 is a common route for the solid-state image pickup element 200, the DSP circuit 120, the display unit 130, the manipulation unit 140, the power supply unit 160, the recording unit 170, and the frame memory 180 exchanging data with each other.

The power supply unit 160 supplies power to a circuit in the image pickup apparatus 100. The recording unit 170 records a frame. The frame memory 180 holds a frame.

Note that the optical unit 110, the solid-state image pickup element 200, the DSP circuit 120, the display unit 130, the manipulation unit 140, the bus 150, the power supply unit 160, the recording unit 170, and the frame memory 180 are provided in the same apparatus, but these may be provided in a plurality of apparatuses in a dispersed manner. For example, the optical unit 110 and the solid-state image pickup element 200 may be disposed in an image pickup apparatus, and the DSP circuit 120 and the like may be disposed in an information processing apparatus.

Figure 2:
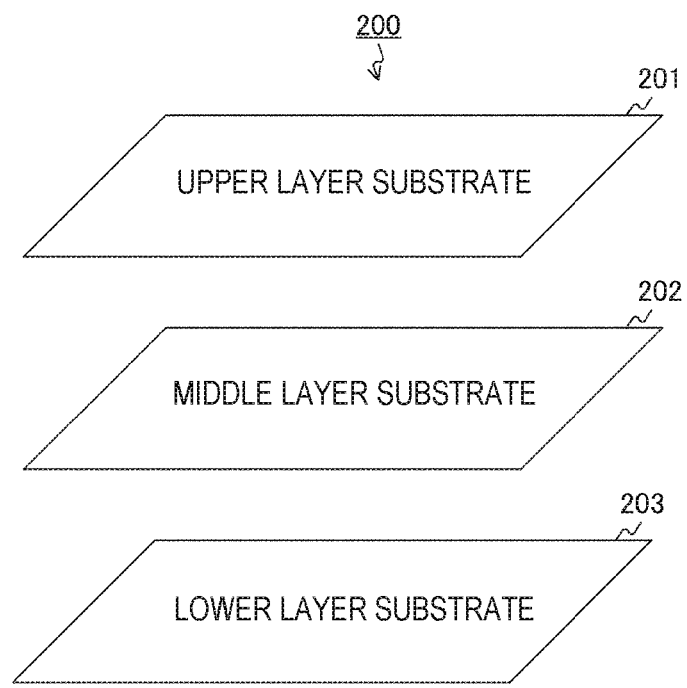
FIG. 2 is a diagram depicting an example of a stack structure of a solid-state image pickup element in the first embodiment of the present technology.

FIG. 2 is a diagram depicting an example of a stack structure of the solid-state image pickup element 200 in the first embodiment. The solid-state image pickup element 200 includes three stacked semiconductor substrates. Among these semiconductor substrates, a semiconductor substrate positioned closest to the optical unit 110 is regarded as an upper layer substrate 201, and a semiconductor substrate positioned farthest from the optical unit 110 is regarded as a lower layer substrate 203. In addition, among the three semiconductor substrates, a substrate positioned between the upper layer substrate 201 and the lower layer substrate 203 is regarded as a middle layer substrate 202.

Circuits in the solid-state image pickup element 200 are disposed in a dispersed manner on the upper layer substrate 201, the middle layer substrate 202, and the lower layer substrate 203. Note that the circuits in the solid-state image pickup element 200 may be disposed on one semiconductor substrate, or may be disposed in a dispersed manner on two semiconductor substrates.

[Configuration Example of Upper Layer Substrate]

Figure 3:
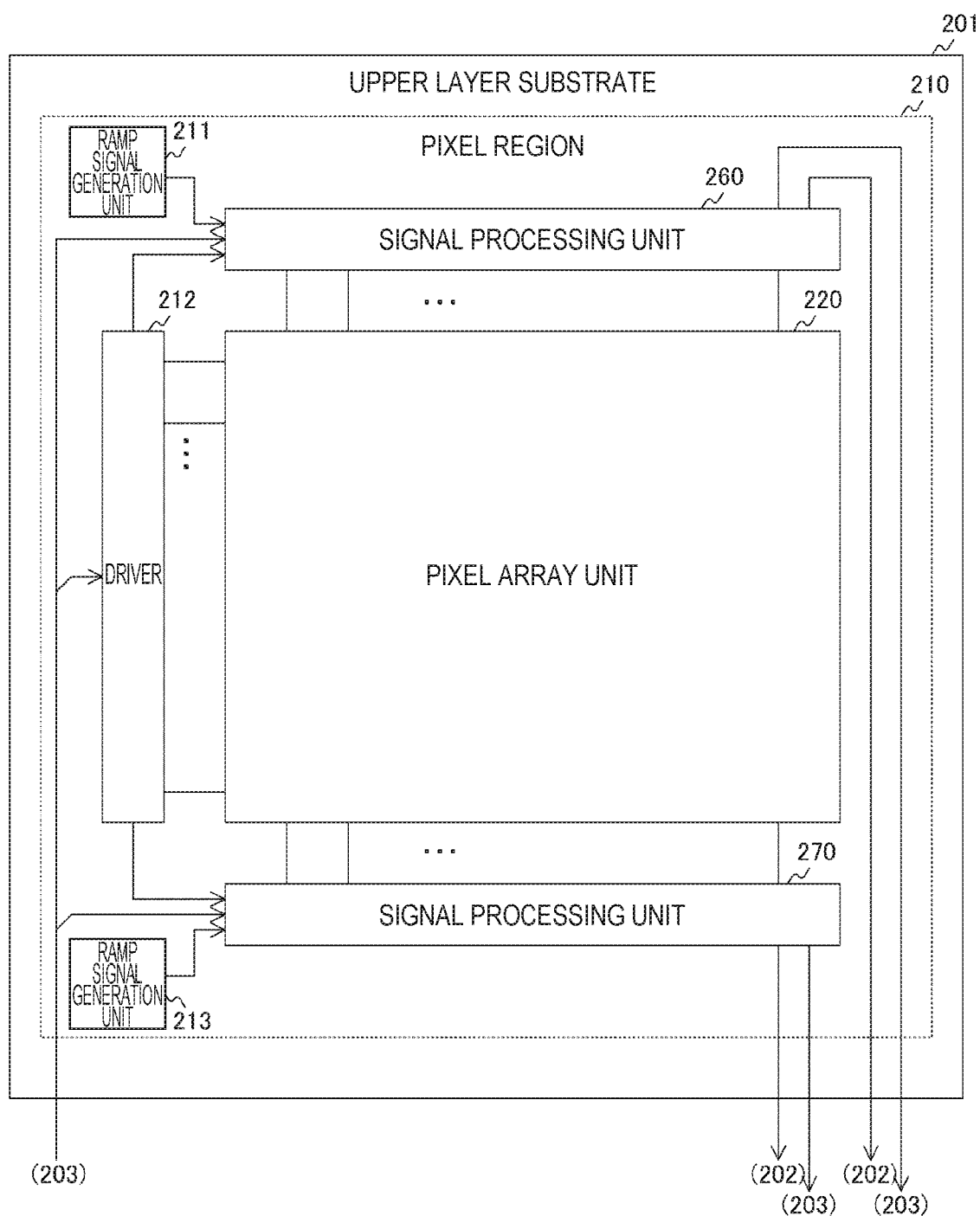
FIG. 3 is a block diagram depicting a configuration example of an upper layer substrate in the first embodiment of the present technology.

FIG. 3 is a block diagram depicting a configuration example of the upper layer substrate 201 in the first embodiment. On the upper layer substrate 201, a pixel region 210 is provided. In the pixel region 210, ramp signal generation units 211 and 213, a driver 212, signal processing units 260 and 270, and a pixel array unit 220 are disposed.

The ramp signal generation units 211 and 213 generate sawtooth ramp signals by digital to analog (DA) conversion. The ramp signal generation unit 211 supplies the generated ramp signal to the signal processing unit 260. On the other hand, the ramp signal generation unit 213 supplies the generated ramp signal to the signal processing unit 270.

In the pixel array unit 220, a plurality of pixels are arrayed in a two-dimensional matrix. Hereinafter, an aggregate of pixels arrayed in a predetermined direction (horizontal direction, etc.) will be referred to as a "row", and an aggregate of pixels arrayed in a direction vertical to the row will be referred to as a "column".

The driver 212 drives the pixel array unit 220 to output an analog pixel signal. Respective exposure times of two frames to be combined are input by the lower layer substrate 203 to the driver 212. In addition, in synchronization with a vertical synchronization signal with a predetermined frequency $f_{VSYNC}$ (60 hertz, etc.), the driver 212 drives the pixel array unit 220. For example, the driver 212 performs a process of sequentially exposing all the rows, twice, for each cycle $T_{VSYNC}$ of $1/f_{VSYNC}$, and causes two image signals to be generated for each cycle $T_{VSYNC}$.

In addition, the driver 212 generates a switching signal SW for changing an output destination of a frame, and supplies the switching signal SW to the signal processing units 260 and 270.

The signal processing units 260 and 270 perform increase-decrease processing and analog to digital (AD)

conversion processing on a pixel signal from the pixel array unit 220. In addition, the signal processing unit 260 is connected to a row different from the signal processing unit 270.

In addition, a digital gain Dg being a digital signal indicating a gain is input by the lower layer substrate 203 to the signal processing units 260 and 270. The signal processing unit 260 and the like increase or decrease a pixel signal using an analog gain obtained by performing DA conversion of the digital gain Dg, and generates pixel data by performing AD conversion of the pixel signal. Then, in accordance with the switching signal SW, the signal processing unit 260 and the like supply a frame including pixel data, to the middle layer substrate 202 or the lower layer substrate 203.

In accordance with the switching signal SW, the driver 212 causes a frame initially generated in the cycle $T_{VSYNC}$, to be supplied to the middle layer substrate 202, and causes a frame generated next, to be supplied to the lower layer substrate 203.

[Configuration Example of Pixel Array Unit]

Figure 4:
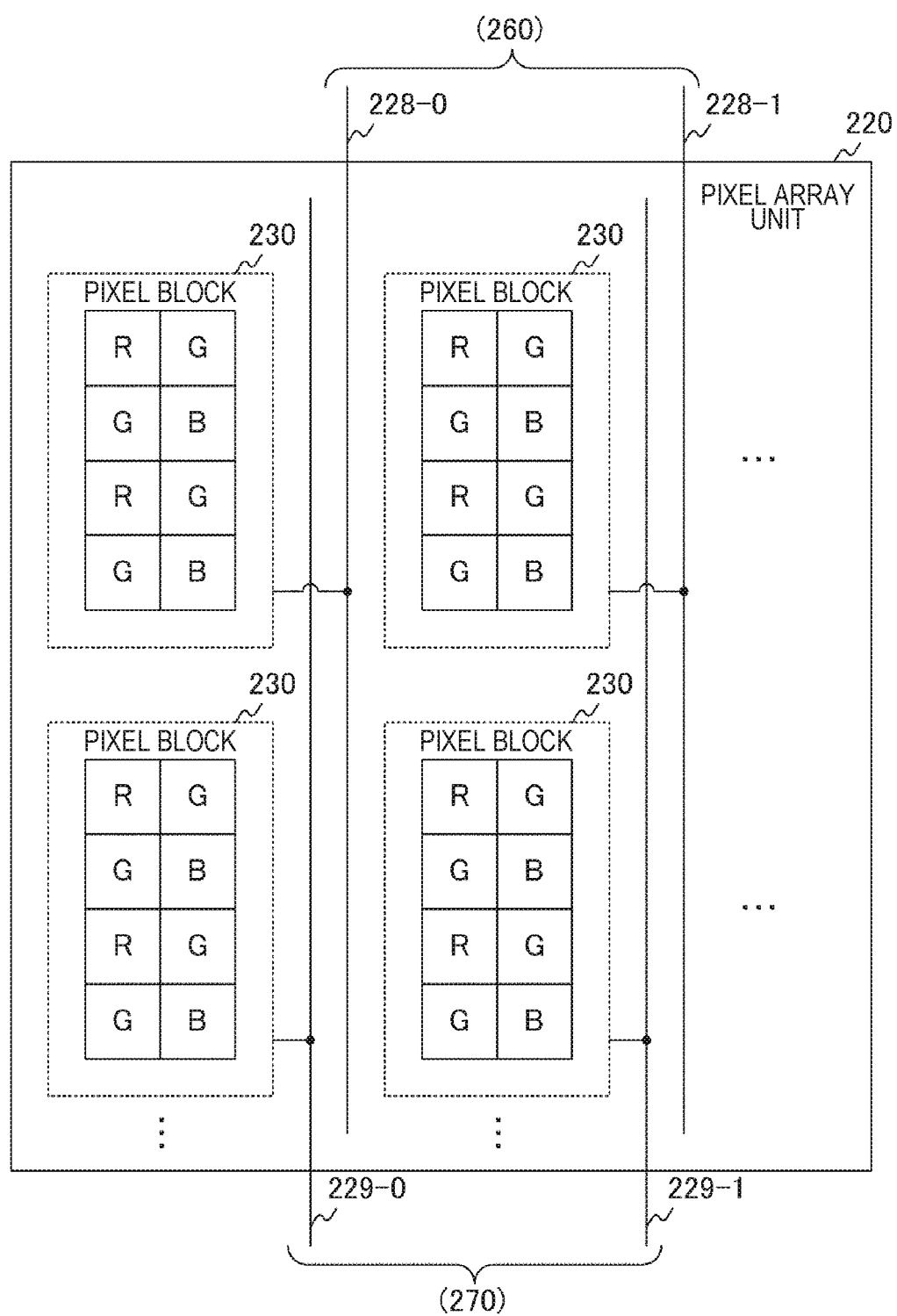
FIG. 4 is a plan view depicting a configuration example of a pixel array unit in the first embodiment of the present technology.

FIG. 4 is a plan view depicting a configuration example of the pixel array unit 220 in the first embodiment. The pixel array unit 220 is divided into a plurality of pixel blocks 230 each including a plurality of pixels (eight pixels as four rows×two columns, etc.). In addition, each of the pixels generates a color signal of any of Red (R), Green (G), and Blue (B), and the pixels corresponding to the respective colors are arrayed in accordance with a Bayer array, for example.

Hereinafter, an aggregate of pixel blocks 230 arrayed in a predetermined direction (horizontal direction, etc.) will be referred to as a "block row", and an aggregate of pixel blocks 230 arrayed in a direction vertical to the block row will be referred to as a "block column". The number of rows of the block rows is I, and the number of columns of the block columns is J, where I and J are integers.

Two vertical signal lines 228-$j$ (j is an integer from 0 to J−1) and 229-$j$ are laid for each block column. In addition, ten horizontal signal lines are laid for each block row. In FIG. 4, the horizontal signal lines are omitted. Among ten horizontal signal lines of each row, one horizontal signal line transmits a reset signal RSTi (i is an integer from 0 to I−1), one horizontal signal line transmits a selection signal SELi, and remaining eight horizontal signal lines transmit transfer signals TRG0$i$ to TRG7$i$.

A horizontal signal line is connected with the driver 212 and pixel blocks 230 in a block row in which the horizontal signal line is laid. The vertical signal line 228-$j$ is connected with an odd-numbered block row and the signal processing unit 260, and the vertical signal line 229-$j$ is connected with an even-numbered block row and the signal processing unit 270.

[Configuration Example of Pixel Block]

Figure 5:
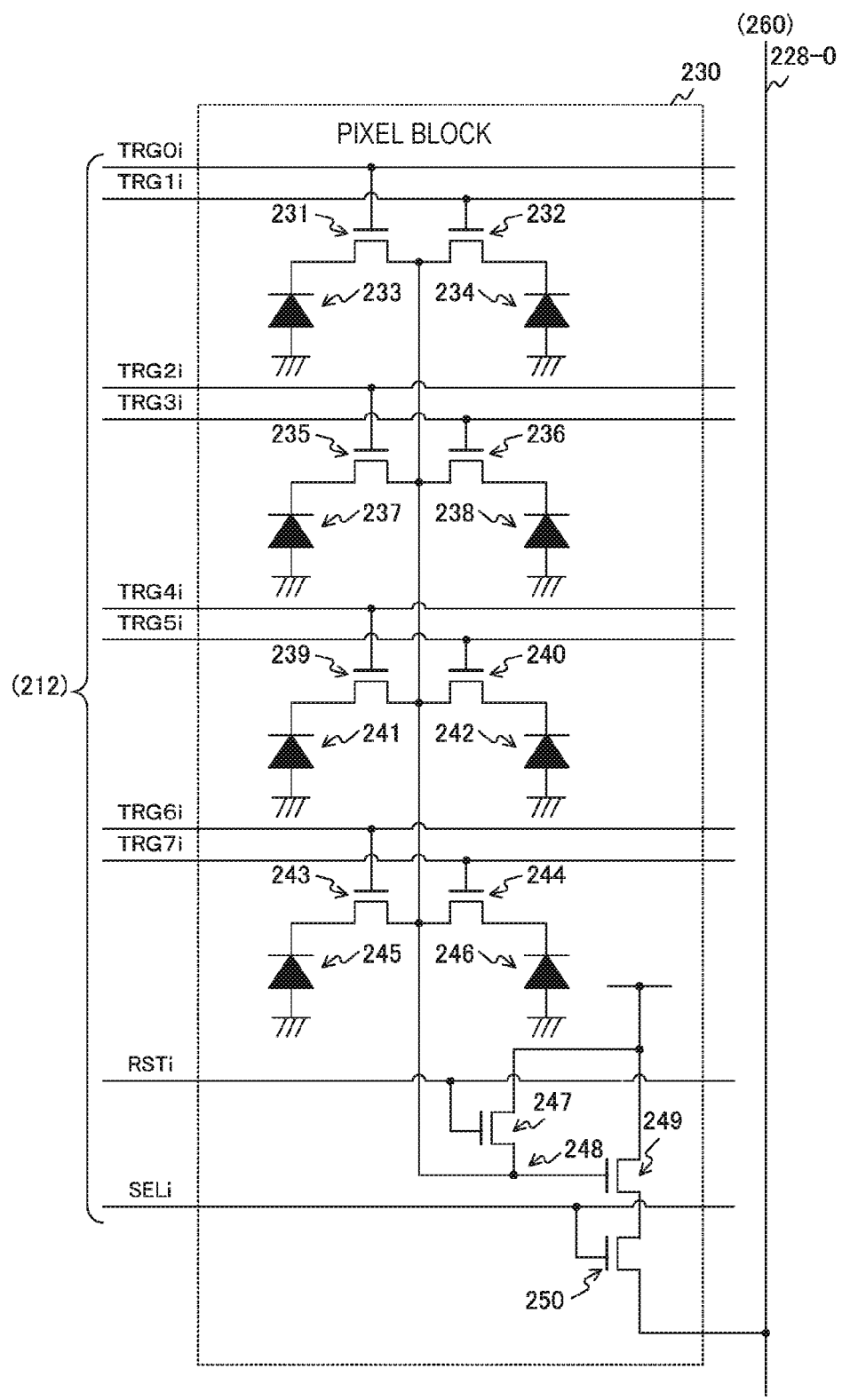
FIG. 5 is a circuit diagram depicting a configuration example of a pixel block in the first embodiment of the present technology.

FIG. 5 is a circuit diagram depicting a configuration example of the pixel block 230 in the first embodiment. The pixel block 230 includes transfer transistors 231, 232, 235, 236, 239, 240, 243, and 244, and photoelectric conversion elements 233, 234, 237, 238, 241, 242, 245, and 246. In addition, the pixel block 230 includes a reset transistor 247, a floating diffusion layer 248, an amplification transistor 249, and a selection transistor 250.

The photoelectric conversion elements 233, 234, 237, 238, 241, 242, 245, and 246 generate electrical charges by photoelectrically converting incident light. These photoelectric conversion elements are connected to transfer transistors different from each other.

In accordance with the transfer signals TRG0$i$ to TRG7$i$, the transfer transistors 231, 232, 235, 236, 239, 240, 243, and 244 transfer electrical charges from corresponding photoelectric conversion elements to the floating diffusion layer 248. The floating diffusion layer 248 accumulates electrical charges, and generates voltage corresponding to an amount of the accumulated electrical charges.

In accordance with the reset signal RSTi, the reset transistor 247 initializes an electrical charge amount by discharging electrical charges in the floating diffusion layer 248 to a power source.

The amplification transistor 249 amplifies a signal of voltage of the floating diffusion layer 248. In accordance with the selection signal SELi, the selection transistor 250 outputs, as a pixel signal, the signal amplified by the amplification transistor 249, to either of the vertical signal lines 228-$j$ and 229-$j$, to which the selection transistor 250 is connected.

The driver 212 starts exposure of rows by sequentially selecting rows of pixels, and supplying the reset signal RSTi to the corresponding rows. In addition, the driver 212 supplies the selection signal SELi to a selected row. Then, when a set exposure time elapses, the driver 212 ends the exposure by supplying the transfer signal TRG0$i$. The exposure of each row is started when a certain period of time elapses from a preceding row. In this manner, a control method of sequentially selecting rows and exposing the rows is called a rolling shutter method.

[Configuration Example of Signal Processing Unit]

Figure 6:
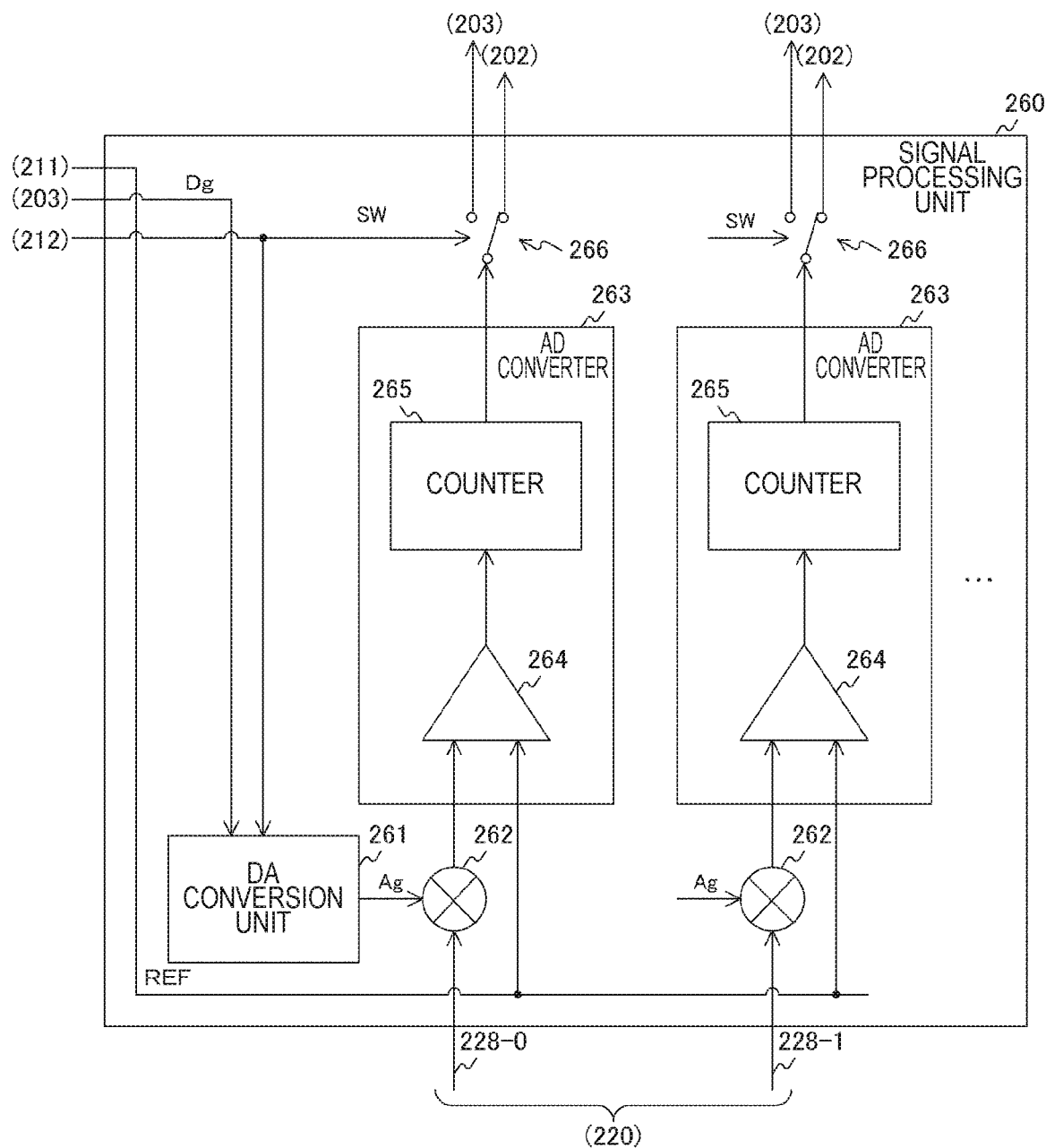
FIG. 6 is a block diagram depicting a configuration example of a signal processing unit corresponding to an odd-numbered block row in the first embodiment of the present technology.

FIG. 6 is a block diagram depicting a configuration example of the signal processing unit 260 corresponding to an odd-numbered block row in the first embodiment. The signal processing unit 260 includes a DA conversion unit 261, a plurality of amplifiers 262, a plurality of AD converters 263, and a plurality of switches 266. The amplifiers 262, the AD converters 263, and the switches 266 are provided for the respective block columns. In a case where the number of columns of the block columns is J, J amplifiers 262, J AD converters 263, and J switches 266 are provided.

The DA conversion unit 261 converts the digital gain Dg into an analog gain Ag. The digital gain Dg is set by the manipulation unit 140 or the like. In addition, the digital gain Dg includes a digital gain $Dg_L$ for a frame having a longer exposure time, and a digital gain $Dg_S$ for a frame having a shorter exposure time, among two frames to be combined. In addition, the analog gain includes an analog gain $Ag_1$ for an image signal of a first frame in the cycle $T_{VSYNC}$, and an analog gain $Ag_2$ for an image signal of a second frame.

A correspondence relationship between the digital gain Dg and the analog gain Ag is decided depending on whether an exposure time of which of the first and second frames is set to a short time. For example, when the second frame is to be subjected to short-time exposure, an analog signal obtained by performing DA conversion of the digital gain $Dg_L$ is used as the analog gain $Ag_1$, and an analog signal obtained by performing DA conversion of the digital gain $Dg_S$ is used as the analog gain $Ag_2$. In accordance with the switching signal SW, the DA conversion unit 261 supplies either of the analog gains $Ag_1$ and $Ag_2$ to the J amplifiers 262.

The amplifier 262 increases or decreases a pixel signal of a corresponding block column using the supplied analog gain Ag. The amplifier 262 supplies the increased or decreased pixel signal to a corresponding AD converter 263. Note that the amplifier 262 is an example of a gain processing unit described in the appended claims.

The AD converter 263 performs AD conversion on the increased or decreased pixel signal. The AD converter 263 includes a comparator 264 and a counter 265. The comparator 264 compares a pixel signal from the amplifier 262 and a ramp signal REF, and supplies a comparison result to the counter 265. In synchronization with a predetermined clock signal, the counter 265 counts a count value until the comparison result reverses. The counter 265 supplies, as pixel data, data indicating a count value, to the switch 266. Note that the AD converter 263 is an example of an analog to digital conversion unit described in the appended claims.

In accordance with the switching signal SW, the switch 266 switches an output destination to either of the middle layer substrate 202 and the lower layer substrate 203, and outputs pixel data.

Figure 7:
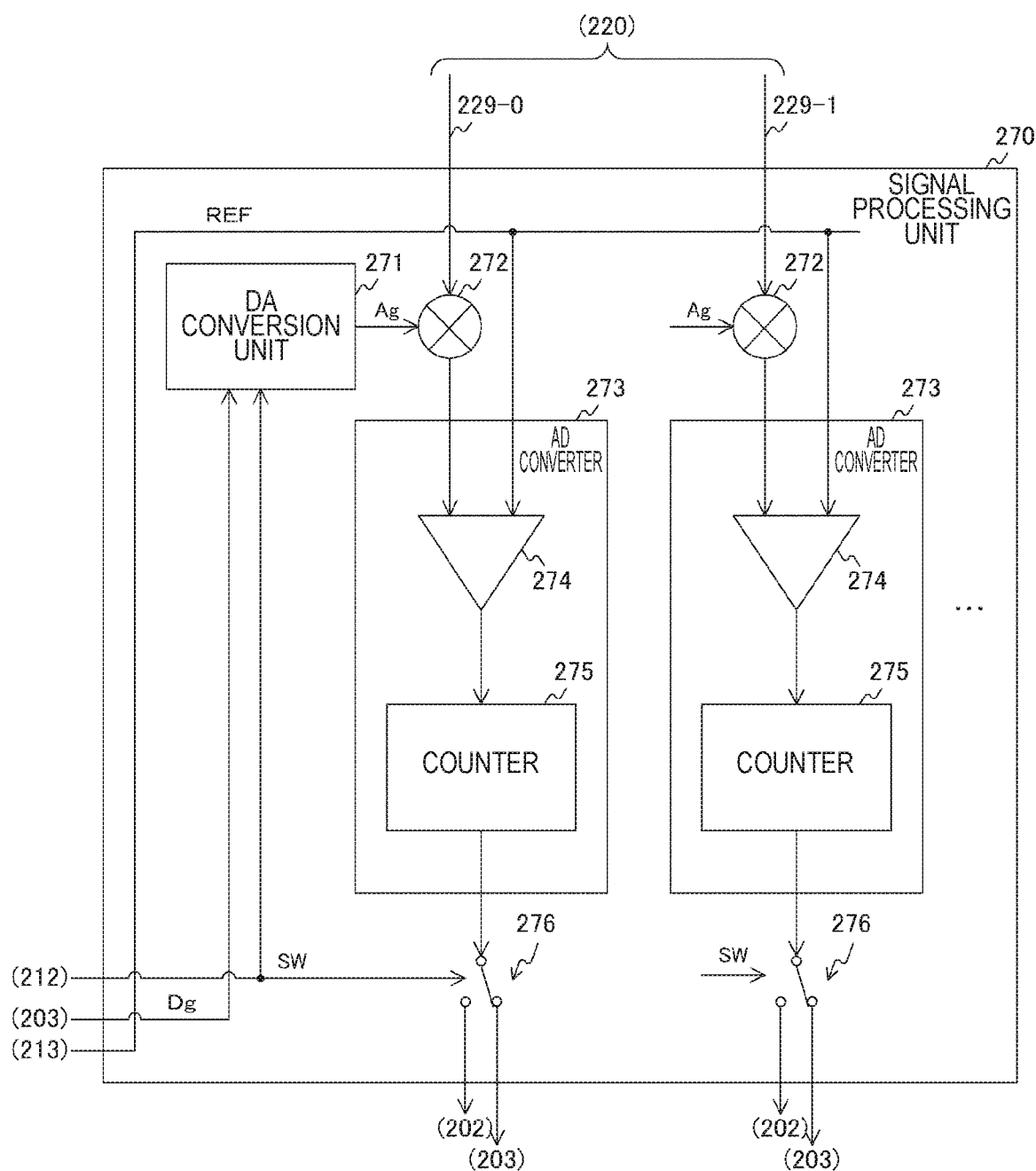
FIG. 7 is a block diagram depicting a configuration example of a signal processing unit corresponding to an even-numbered block row in the first embodiment of the present technology.

FIG. 7 is a block diagram depicting a configuration example of the signal processing unit 270 corresponding to an even-numbered block row in the first embodiment. A configuration of the signal processing unit 270 is similar to that of the signal processing unit 260 except that a block row to which the signal processing unit 270 is connected is different.

[Configuration Example of Middle Layer Substrate]

Figure 8:
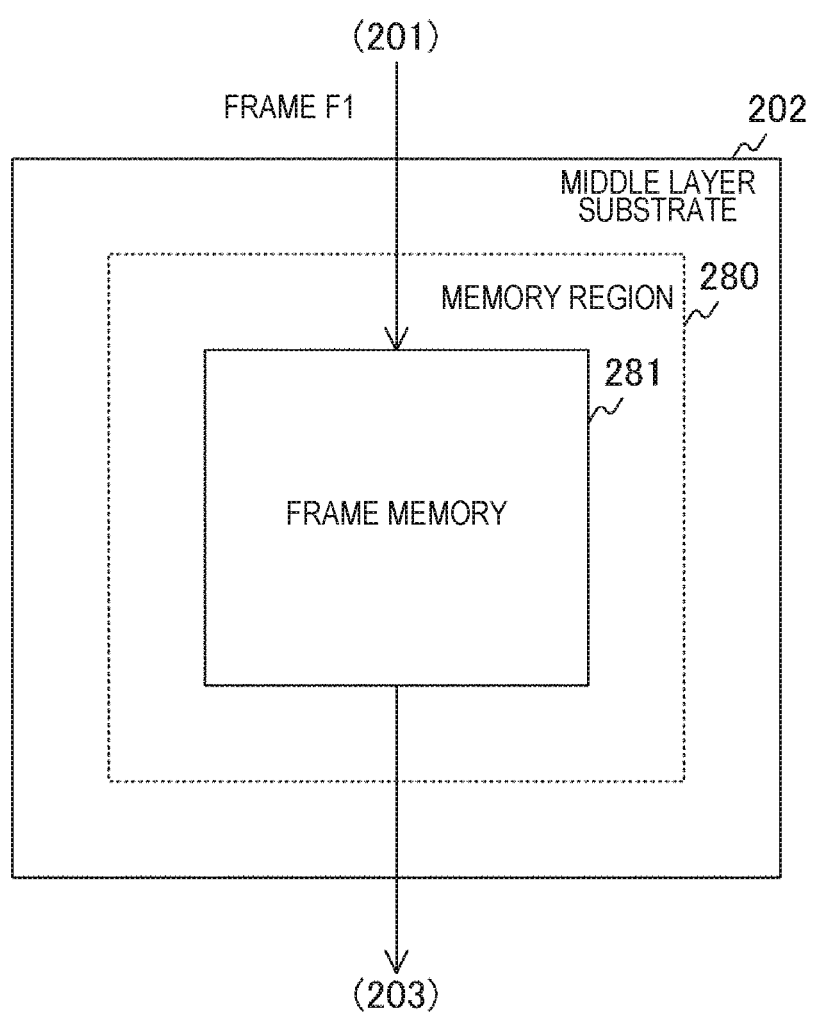
FIG. 8 is a diagram depicting a configuration example of a middle layer substrate in the first embodiment of the present technology.

FIG. 8 is a diagram depicting a configuration example of the middle layer substrate 202 in the first embodiment. On the middle layer substrate 202, a memory region 280 is provided. In the memory region 280, a frame memory 281 is disposed. The frame memory 281 holds a frame including pixel data output from the upper layer substrate 201. The frame held in the frame memory 281 is read out by the lower layer substrate 203. As the frame memory 281, for example, a dynamic random access memory (DRAM) is used.

[Configuration Example of Lower Layer Substrate]

Figure 9:
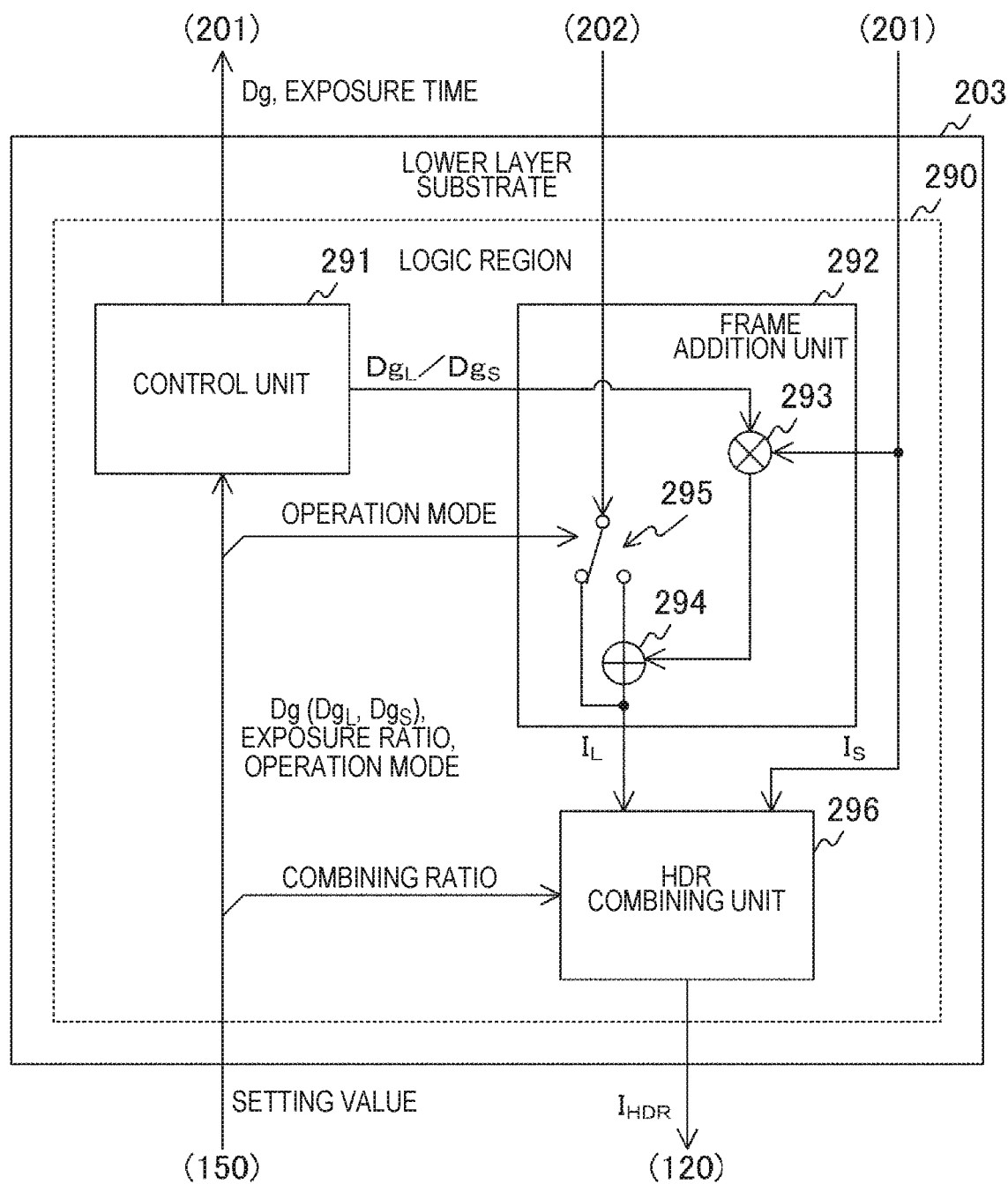
FIG. 9 is a block diagram depicting a configuration example of a lower layer substrate in the first embodiment of the present technology.

FIG. 9 is a block diagram depicting a configuration example of the lower layer substrate 203 in the first embodiment. On the lower layer substrate 203, a logic region 290 is provided. In the logic region 290, a control unit 291, a frame addition unit 292, and a high dynamic range (HDR) combining unit 296 are disposed.

The control unit 291 controls the entire solid-state image pickup element 200. The digital gains Dg ($Dg_L$ and $Dg_S$), an exposure ratio, and an operation mode are input to the control unit 291 as setting values via the bus 150. In addition, when a shorter exposure time is denoted by $t_s$ and a longer exposure time is denoted by $t_L$, out of respective exposure times of two frames to be combined, $t_s : t_L$ is input as an exposure ratio.

On the basis of the exposure ratio, the control unit 291 sets the exposure time $t_1$ of the first frame and the exposure time $t_2$ of the second frame, out of the two frames to be combined. In the frame non-addition mode, for example, a value of the exposure time $t_L$ is set as the exposure time $t_1$, and a value of the exposure time $t_S$ is set as the exposure time $t_2$. The exposure time of the first frame thereby becomes longer than the other.

On the other hand, in the frame addition mode, a frame obtaining by adding the first frame and the second frame is combined with the second frame as a frame having a longer exposure time. Thus, the control unit 291 sets the exposure times $t_1$ and $t_2$ in such a manner that a total of the exposure times $t_1$ and $t_2$ becomes the exposure time $t_L$. For example, the control unit 291 sets a difference between the exposure times $t_L$ and $t_S$ as the exposure time $t_1$, and sets the exposure time $t_S$ as the exposure time $t_2$.

In addition, the control unit 291 holds the input digital gains $Dg_L$ and $Dg_S$, and outputs the held digital gains $Dg_L$ and $Dg_S$, and the exposure times $t_1$ and $t_2$ to the upper layer substrate 201. Furthermore, in the frame addition mode, the control unit 291 supplies a gain ratio $Dg_L/Dg_S$ to the frame addition unit 292.

The frame addition unit 292 includes a multiplier 293, an adder 294, and a switch 295. The multiplier 293 multiplies each piece of pixel data in the first frame from the upper layer substrate 201, and the gain ratio $Dg_L/Dg_S$. The multiplier 293 supplies the multiplied data to the adder 294.

In accordance with an operation mode, the switch 295 outputs each piece of pixel data in the first frame from the middle layer substrate 202, to either of the adder 294 and the HDR combining unit 296. In the frame non-addition mode, the switch 295 outputs the pixel data to the HDR combining unit 296. On the other hand, in the frame addition mode, the switch 295 outputs the pixel data to the adder 294.

The adder 294 adds the pixel data from the switch 295 and the multiplied data from the multiplier 293. The pixel data from the switch 295, or the data added by the adder 294 is output to the HDR combining unit 296 as long-time exposure data $I_L$. In addition, the pixel data in the first frame from the upper layer substrate 201 is output to the HDR combining unit 296 as short-time exposure data $I_S$. Note that the frame addition unit 292 is an example of a calculation unit described in the appended claims.

The HDR combining unit 296 combines the long-time exposure data $I_L$ and the short-time exposure data $I_S$ at a predetermined combining ratio. For example, when a combining ratio is denoted by $R_{HDR}$, pixel data $I_{HDR}$ in the combined frame is calculated by the following formula. The HDR combining unit 296 supplies the generated pixel data $I_{HDR}$ to the DSP circuit 120. Note that the HDR combining unit 296 is an example of a combining unit described in the appended claims.

$$I_{HDR} = R_{HDR} \times I_L + (1 - R_{HDR}) \times I_S$$

Note that the frame addition unit 292 determines whether or not to perform addition, in accordance with an operation mode, but addition may be always performed without distinguishing an operation mode between the frame addition mode and the frame non-addition mode. In this case, the switch 295 becomes unnecessary.

Figure 10:
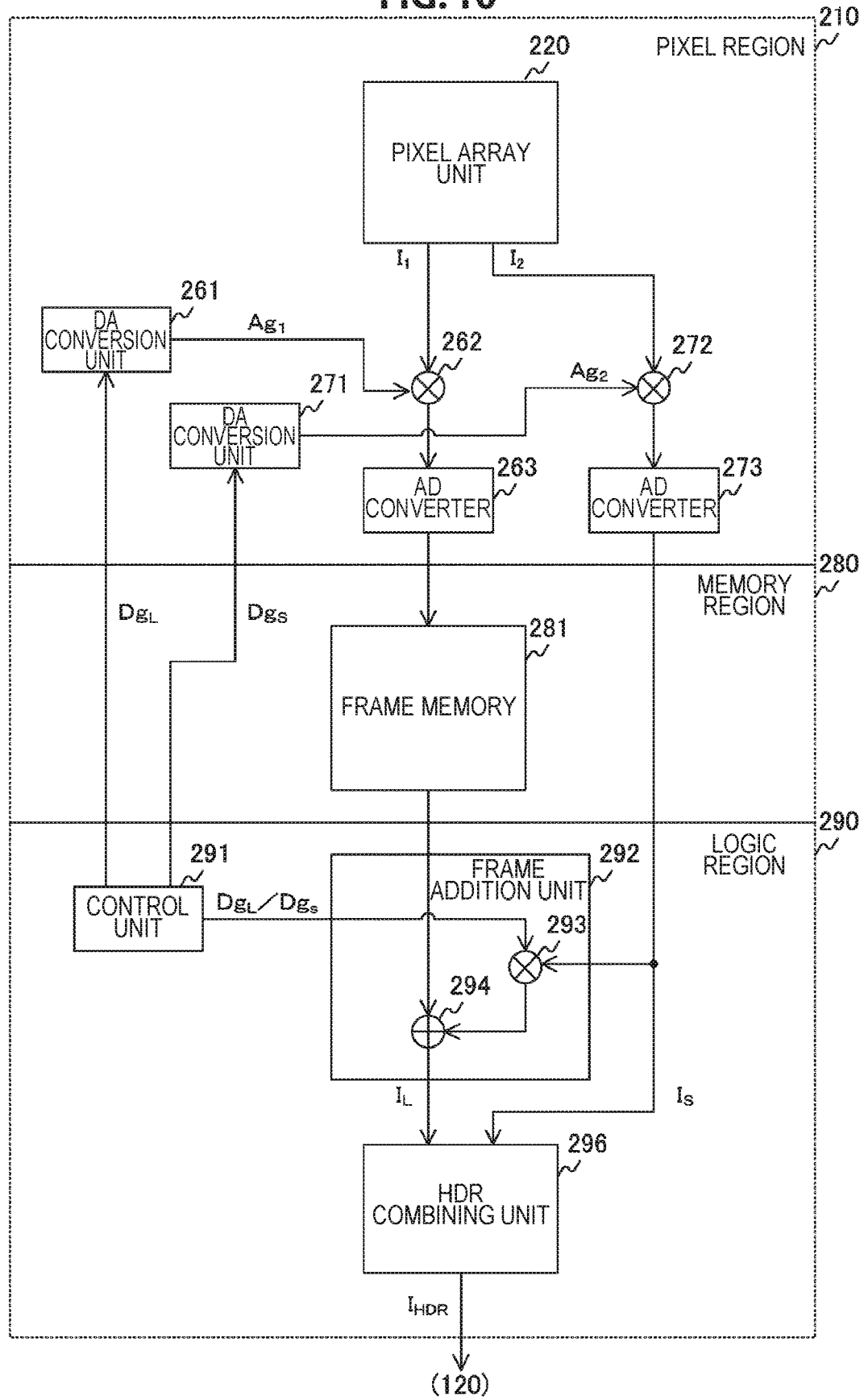
FIG. 10 is a diagram for describing a combining process of the solid-state image pickup element in the first embodiment of the present technology.

FIG. 10 is a diagram for describing a combining process of a solid-state image pickup element in the first embodiment. In the frame addition mode, the pixel array unit 220 sequentially generates two image signals. On the other hand, the DA conversion unit 261 converts the digital gain $Dg_L$ for a frame having a longer exposure time, into the analog gain $Ag_1$ for the first image signal. In addition, a DA conversion unit 271 converts the digital gain $Dg_S$ for a frame having a shorter exposure time, into the analog gain $Ag_2$ for the second image signal.

Then, the amplifier 272 increases or decreases each pixel signal in the first image signal using the analog gain $Ag_1$, and the amplifier 272 increases or decreases each pixel signal in the second image signal using the analog gain $Ag_2$. AD converters 263 and 273 perform AD conversion of each of the increased or decreased pixel signals into pixel data. Two frames are thereby generated. Among these frames, the first frame is held in the frame memory 281. On the other hand, pixel data in the second frame is output as the short-time exposure data $I_S$.

The frame addition unit 292 generates the long-time exposure data $I_L$ by adding data obtained by multiplying the short-time exposure data Is by the gain ratio $Dg_L/Dg_S$, and the pixel data in the first frame. The above-described calculations performed by the amplifiers 262 and 272, and the frame addition unit 292 are represented by the following formulae.

$$I_L = Ag_1 \times I_1 + (Ag_2 \times I_2) \times Dg_L/Dg_S \quad \text{Formula 1}$$

$$I_S = Ag_2 \times I_2 \quad \text{Formula 2}$$

Here, as described above, the DA conversion units 261 and 271 convert the digital gain $Dg_L$ into the analog gain $Ag_1$, and the DA conversion unit 271 converts the digital gain $Dg_S$ into the analog gain $Ag_2$. Thus, in Formulae 1 and 2, $Ag_1$ can be replaced with $Dg_L$, and $Ag_2$ can be replaced with $Dg_S$. As a result, the following formulae are obtained.

$$I_L = Dg_L \times I_1 + (Dg_S \times I_2) \times Dg_L/Dg_S = Dg_L \times (I_1 + I_2) \quad \text{Formula 3}$$

$$I_S = Dg_S \times I_2 \quad \text{Formula 4}$$

As exemplified in Formula 3, by multiplying the gain ratio $Dg_L/Dg_S$, an increase-decrease ratio of the second image signal ($I_2$) can be adjusted to the digital gain $Dg_L$ corresponding to the long-time exposure data. On the other hand, because the second image signal ($I_2$) is increased or decreased using the corresponding gain $Dg_S$, by Formula 4, the multiplication of $Dg_L/Dg_S$ is not necessary.

For example, it is assumed that the user sets 1.1 as the digital gain $Dg_L$, and sets 0.9 as the digital gain $Dg_S$. When these values are substituted into Formulae 3 and 4, the following formulae are obtained.

$$I_L = 1.1 \times I_1 + (0.9 \times I_2) \times 1.1/0.9 = 1.1 \times (I_1 + I_2) \quad \text{Formula 5}$$

$$I_S = 0.9 \times I_2$$

Here, if addition is performed without multiplying the gain ratio 1.1/0.9 in Formula 5, a signal $I_1$ increased to 1.1 times and a signal $I_2$ decreased to 0.9 times are added. Thus, an increase-decrease ratio for the added signals ($I_1+I_2$) becomes a value different from set 1.1.

In contrast to this, if addition is performed after multiplying the short-time exposure data by the gain ratio 1.1/0.9 (0.9×$I_2$), an increase-decrease ratio for the added signals ($I_1+I_2$) can be adjusted to set 1.1.

In addition, by adding two frames and using the added data as long-time exposure data, an exposure time of the long-time exposure data can be prolonged as compared with a case where the addition is not performed.

Note that, if frame addition is performed after AD conversion is performed in a state in which an increase or decrease is not performed using an analog gain, and the addition data is multiplied by the digital gain $Dg_L$, multiplication of the gain ratio $Dg_L/Dg_S$ becomes unnecessary, but this configuration is not desirable. This is because, if an increase or decrease is performed using a digital gain, due to overflow or the like, there is concern that gradation is lost and signal quality declines.

In addition, the solid-state image pickup element 200 combines the first frame as the short-time exposure data Is, but the solid-state image pickup element 200 may combine the second frame as the short-time exposure data Is in place of the first frame. In this case, the DA conversion unit 261 and the like convert the digital gain $Dg_S$ into the analog gain $Ag_1$, and convert the digital gain $Dg_L$ into the analog gain $Ag_2$.

In addition, both of the memory region 280 and the logic region 290 are provided inside the solid-state image pickup element 200, but at least a part of these may be provided on the outside of the solid-state image pickup element 200. For example, the logic region 290 may be disposed in the DSP circuit 120. Nevertheless, when the memory region 280 and the logic region 290 are disposed inside the solid-state image pickup element 200, load of data transfer is reduced and high-speed processing is enabled, and moreover, there is no need to add a new circuit to the DSP circuit 120 provided on a subsequent stage. Thus, the memory region 280 and the logic region 290 are preferably disposed inside the solid-state image pickup element 200.

Figure 11A:
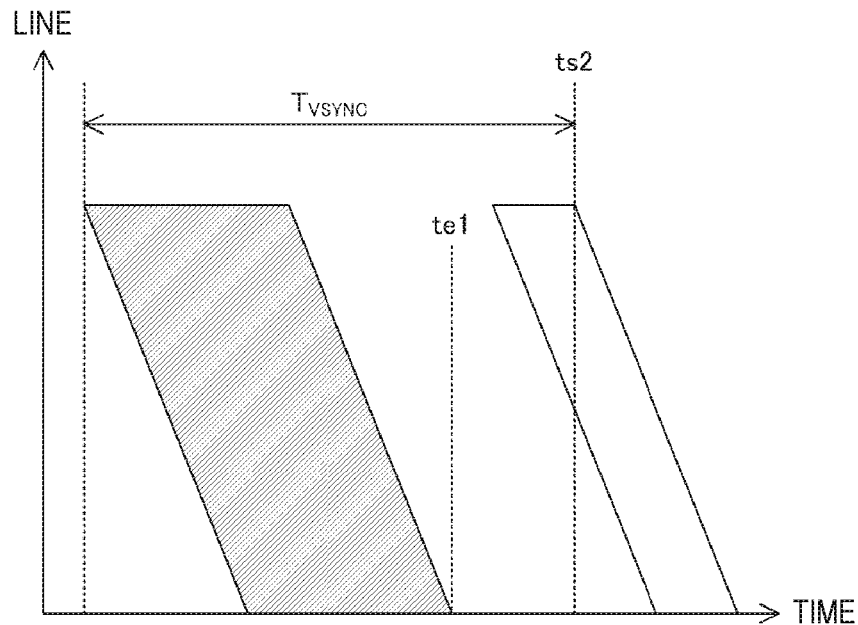
FIGS. 11A and 11B are diagrams for describing a driving timing of a pixel in a comparative example.
Figure 11B:
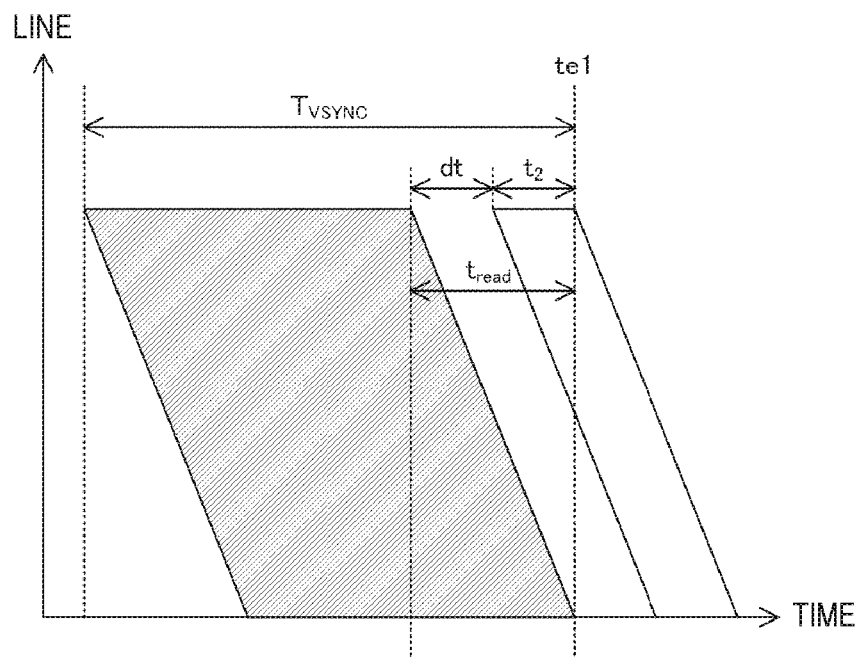

FIGS. 11A and 11B are diagrams for describing a driving timing of a pixel in a comparative example. In a case where two frames are picked up and combined for each cycle TVSYNC, exposure times of the respective frames are set to be equal to or smaller than the cycle TVSYNC. In the drawing, a vertical axis indicates a row (i.e. line) and a horizontal axis indicates a time. In addition, a shaded portion indicates the first frame and an unfilled portion indicates the second frame.

Here, a comparative example in which only one AD converter is disposed for each column will be assumed. In this comparative example, because a solid-state image pickup element cannot simultaneously perform AD conversion of two rows, unless readout of the first frame is completed, readout of the second frame cannot be started.

FIG. 11A is a diagram depicting a case where the readout of the second frame is started at a timing ts2 at which a certain period of time has elapsed from a timing te1 at which the readout of all the rows of the first frame has been completed. In addition, FIG. 11B is a diagram depicting a case where the readout of the second frame is started at a timing te1 at which the readout of all the rows of the first frame has been completed using a further longer exposure time of the first frame. In the comparative example, because two rows cannot be simultaneously read out, unless an exposure time of the second frame is made shorter, an exposure time of the first frame cannot be made longer than that in FIG. 11B in the drawing.

Thus, when an exposure time of the second frame is denoted by $t_2$, and a time required for readout of all rows is denoted by $t_{read}$, a time between an exposure end time of the first frame and an exposure start time of the second frame needs to be set to a difference dt between $t_{read}$ and $t_2$ or more. In other words, the exposure of the second frame cannot be started simultaneously with the exposure end of the first frame.

In contrast to this, in the solid-state image pickup element 200, because two AD converters including the AD converter 263 and the AD converter 273 are disposed for each column, the solid-state image pickup element 200 can simultaneously read out two rows and perform AD conversion.

Figure 12:
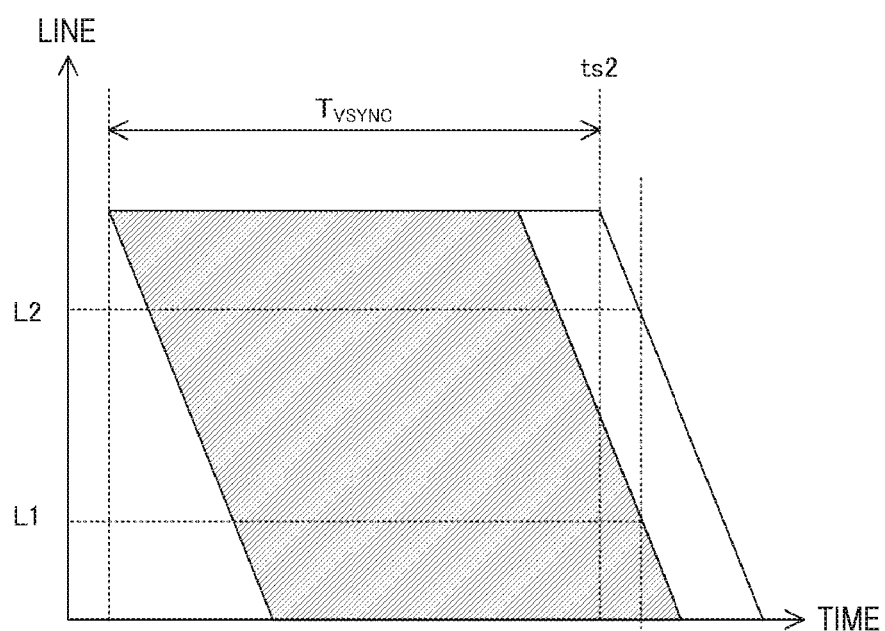
FIG. 12 is a diagram depicting a driving timing of a pixel in the first embodiment of the present technology.

FIG. 12 is a diagram depicting an example of a driving timing of a pixel in the first embodiment. In the drawing, a vertical axis indicates a row (line) and a horizontal axis indicates a time. In addition, a shaded portion indicates the first frame and an unfilled portion indicates the second frame. As described above, because the solid-state image pickup element 200 can simultaneously read out two rows, the readout of the second frame can be started at a timing ts2 being a halfway timing of the readout of the first frame.

For example, a case where an L2 row of the second row is read out in the readout of an L1 row of the first frame will be considered. In a case where the L1 row is a row in an odd-numbered block row, and the L2 row is a row in an even-numbered block row, the L1 row is read out by the signal processing unit 260 including the AD converter 263, and the L2 row is read out by the signal processing unit 270 including the AD converter 273. In accordance with the switching signal SW, the driver 212 causes the first frame to be output to the frame memory 281, and causes the second frame to be output to the logic region 290. Rows of the first frame that are subsequent to the L1 row are read out by the signal processing unit 260 if the rows are rows in the odd-numbered block row, and read out by the signal processing unit 270 if the rows are rows in the even-numbered block row. The same applies to the second frame. Because a block row include four rows, in accordance with the switching signal SW, the driver 212 changes respective output destinations of the signal processing unit 260 and the signal processing unit 270 for each readout of four rows.

In this manner, the solid-state image pickup element 200 can start readout of the second frame without waiting for a readout end of all rows of the first frame. Thus, it becomes unnecessary to provide dt between the exposure end time of the first frame and the exposure start time of the second frame, and an exposure time of the first frame can be made longer than that in the comparative example.

Note that the solid-state image pickup element 200 simultaneously reads out two rows using the signal processing units 260 and 270, but the solid-state image pickup element 200 may simultaneously read out three or more rows by providing three or more signal processing units connected to rows different from each other.

Figure 13A:
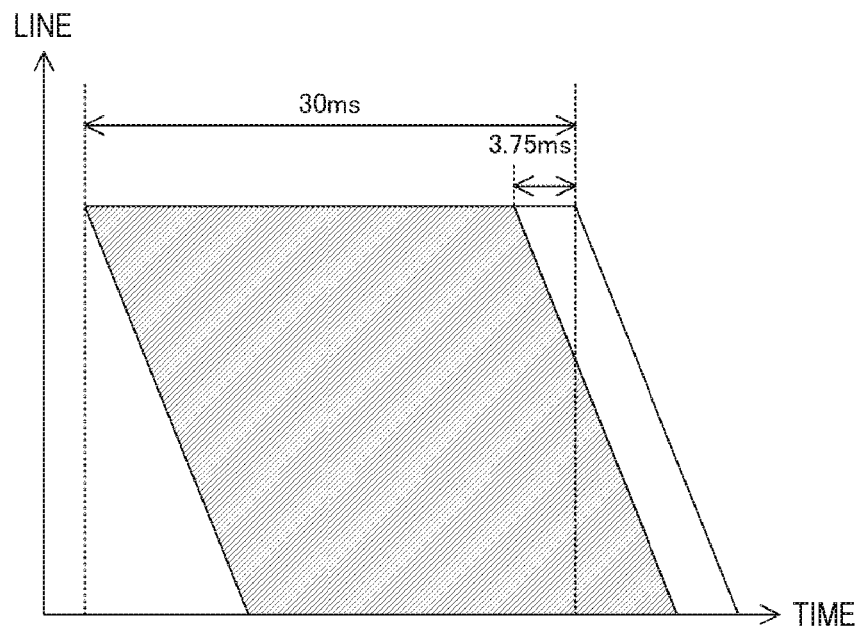
FIGS. 13A and 13B are diagrams depicting a driving timing in each mode in a case where an exposure ratio in the first embodiment of the present technology is set to 1:8.
Figure 13B:
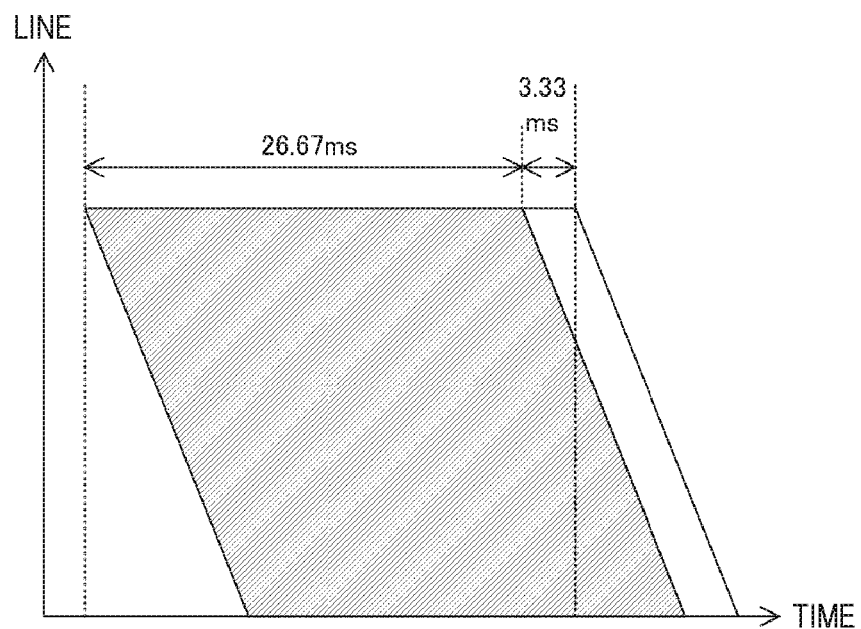

FIGS. 13A and 13B are diagrams depicting a driving timing in each mode in a case where an exposure ratio in the first embodiment is set to 1:8. In the drawing, a vertical axis indicates a row (line) and a horizontal axis indicates a time. In addition, a shaded portion indicates the first frame and an unfilled portion indicates the second frame. FIG. 13A depicts a driving timing in the frame addition mode, and FIG. 13B depicts a driving timing in the frame non-addition mode.

In the frame addition mode, because the first frame and the second frame are added, the exposure times $t_1$ and $t_2$ are set in such a manner that a ratio between the exposure time $t_2$ of the second frame and a total of the exposure time $t_1$ and the exposure time $t_2$ of the first frame $(t_1+t_2)$ becomes 1:8. In a case where the cycle $T_{VSYNC}$ is 30 milliseconds (ms), for example, if the exposure time $t_2$ is set to 3.75 milliseconds (ms), and the total $(t_1+t_2)$ is set to 30 milliseconds (ms), the exposure ratio becomes 1:8. As the exposure time $t_1$, 26.25 milliseconds (ms) being a difference of these is set.

On the other hand, in the frame non-addition mode, because frames are not added, the exposure times $t_1$ and $t_2$ are set in such a manner that a ratio between the exposure time $t_2$ of the second frame and the exposure time $t_1$ of the first frame becomes 1:8. For example, if the exposure time $t_2$ is set to 3.33 milliseconds (ms) and the exposure time $t_1$ is set to 26.67 milliseconds (ms), the exposure ratio becomes 1:8.

As exemplified FIGS. 13A and 13B, when comparison is made using the same exposure ratio, in the frame addition mode, an exposure time of long-time exposure data can be set to be longer than that in the frame non-addition mode.

Figure 14A:
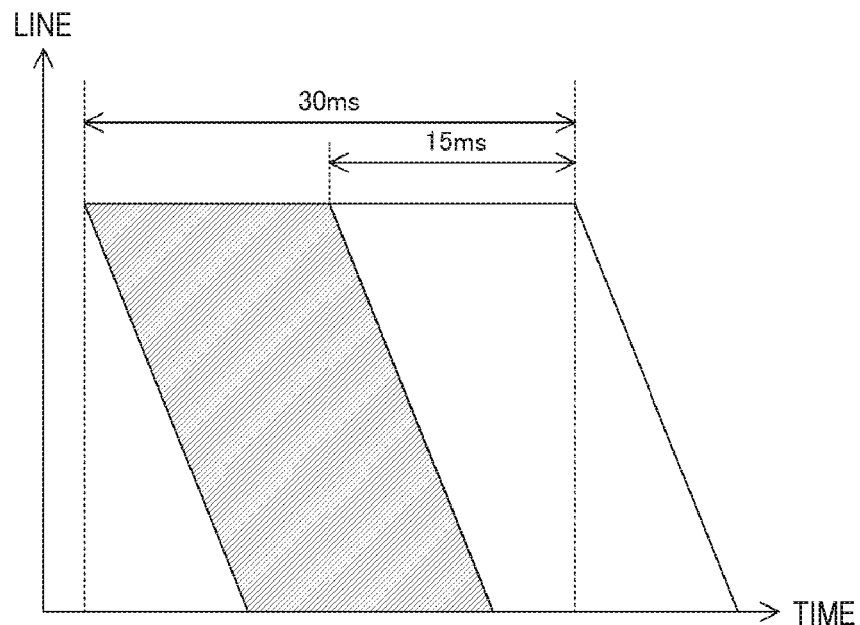
FIGS. 14A and 14B are diagrams depicting a driving timing in each mode in a case where an exposure ratio in the first embodiment of the present technology is set to 1:2.
Figure 14B:
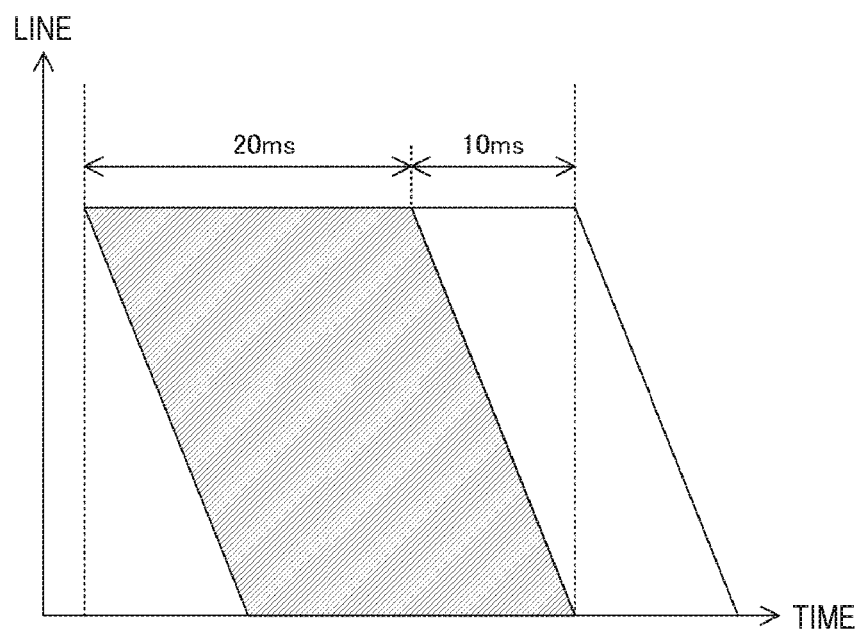

FIGS. 14A and 14B are diagrams depicting a driving timing in each mode in a case where an exposure ratio in the first embodiment is set to 1:2. In the drawing, a vertical axis indicates a row (line) and a horizontal axis indicates a time. In addition, a shaded portion indicates the first frame and an unfilled portion indicates the second frame. FIG. 14A depicts a driving timing in the frame addition mode, and FIG. 14B depicts a driving timing in the frame non-addition mode.

In the frame addition mode, because the first frame and the second frame are added, the exposure times $t_1$ and $t_2$ are set in such a manner that a ratio between the exposure time $t_2$ and a total $(t_1+t_2)$ becomes 1:2. In a case where the cycle $T_{VSYNC}$ is 30 milliseconds (ms), for example, if the exposure time $t_2$ is set to 15 milliseconds (ms), and the total $(t_1+t_2)$ is set to 30 milliseconds (ms), the exposure ratio becomes 1:2. As the exposure time $t_1$, 15 milliseconds (ms) being a difference of these is set.

On the other hand, in the frame non-addition mode, because frames are not added, the exposure times $t_1$ and $t_2$ are set in such a manner that a ratio between the exposure time $t_2$ of the second frame and the exposure time $t_1$ of the first frame becomes 1:2. For example, if the exposure time $t_2$ is set to 10 milliseconds (ms) and the exposure time $t_1$ is set to 20 milliseconds (ms), the exposure ratio becomes 1:2.

Figure 15A:
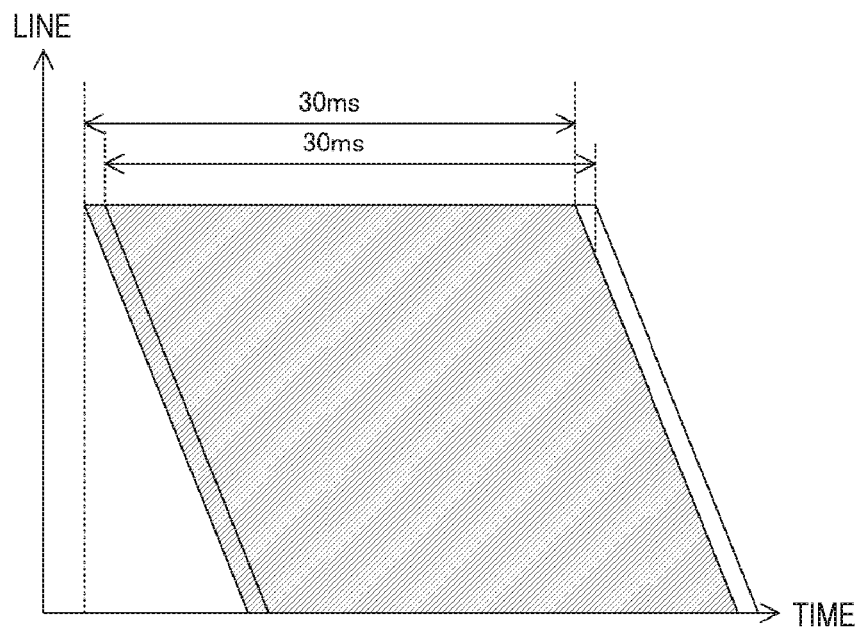
FIGS. 15A and 15B are diagrams depicting a driving timing in each mode in a case where an exposure ratio in the first embodiment of the present technology is set to 1:1.
Figure 15B:
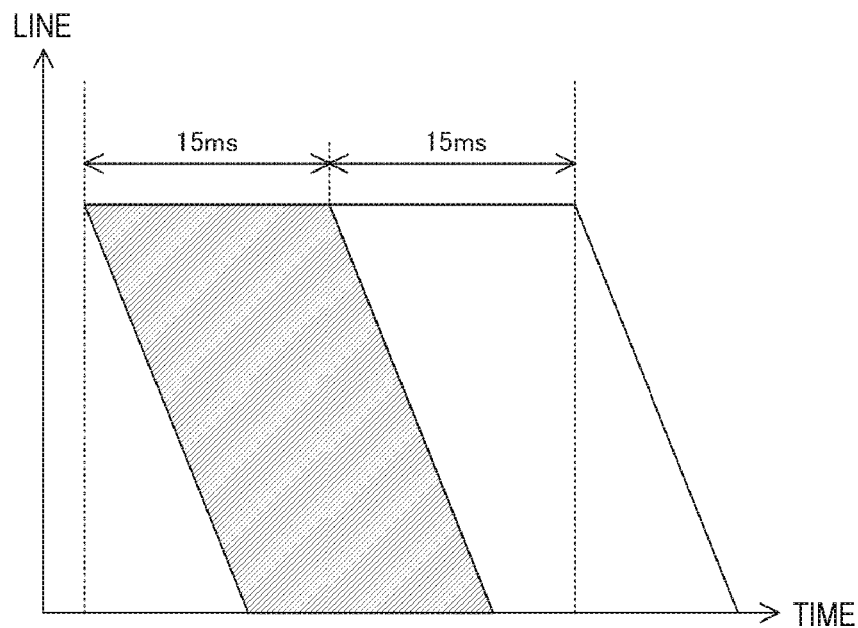

FIGS. 15A and 15B are diagrams depicting a driving timing in each mode in a case where an exposure ratio in the first embodiment is set to 1:1. In the drawing, a vertical axis indicates a row (line) and a horizontal axis indicates a time. In addition, a shaded portion indicates the first frame and an unfilled portion indicates the second frame. FIG. 15A depicts a driving timing in the frame addition mode, and FIG. 15B depicts a driving timing in the frame non-addition mode.

In the frame addition mode, because the first frame and the second frame are added, the exposure times $t_1$ and $t_2$ are set in such a manner that a ratio between the exposure time $t_2$ and a total $(t_1+t_2)$ becomes 1:1. In a case where the cycle $T_{VSYNC}$ is 30 milliseconds (ms), for example, if the exposure time $t_2$ is set to 30 milliseconds (ms), and the total $(t_1+t_2)$ is set to 30 milliseconds (ms), the exposure ratio becomes 1:1.

On the other hand, in the frame non-addition mode, because frames are not added, the exposure times $t_1$ and $t_2$ are set in such a manner that a ratio between the exposure time $t_2$ of the second frame and the exposure time $t_1$ of the first frame becomes 1:1. For example, if the exposure time $t_2$ is set to 15 milliseconds (ms) and the exposure time $t_1$ is set to 15 milliseconds (ms), the exposure ratio becomes 1:1.

As exemplified in FIGS. 13A, 13B, 14A, 14B, 15A, and 15B, in the frame addition mode, if an exposure ratio is set to any value, an exposure time (t1+t2) of long-time exposure data can be set to the cycle TVSYNC.

[Operation Example of Solid-State Image Pickup Element]

Figure 16:
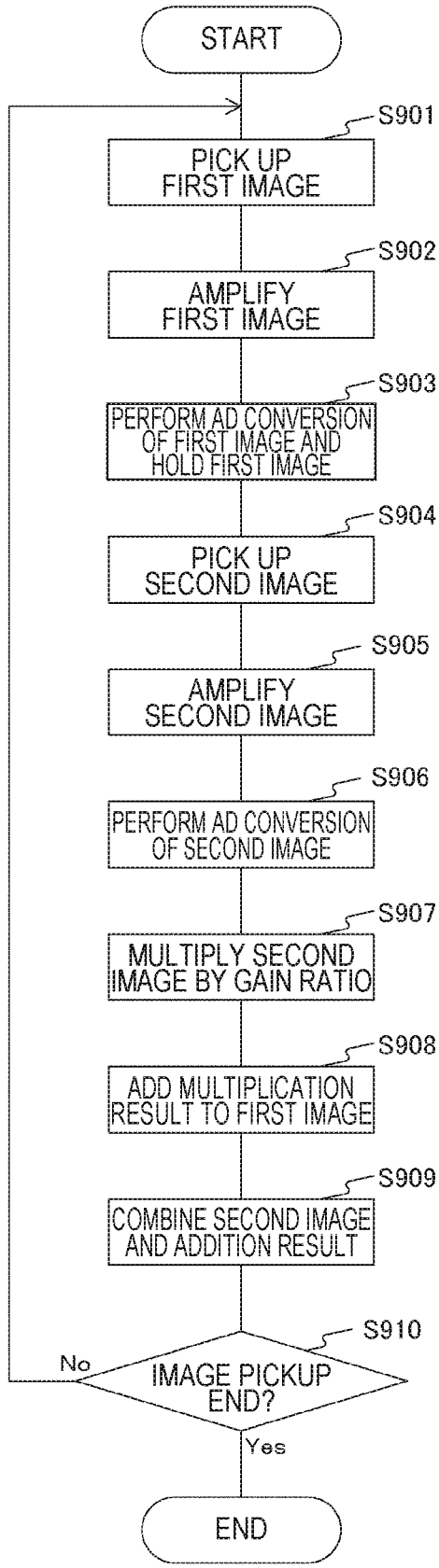

FIG. 16 is a flow chart depicting an example of an operation of a solid-state image pickup element in the first embodiment. The operation is started in a case where the frame addition mode is set, for example. The solid-state image pickup element 200 picks up the first image (step S901), and increases or decreases an image signal thereof using an analog gain (step S902). Then, the solid-state image pickup element 200 performs AD conversion of the increased or decreased image signal into image data (frame), and holds the image data into the frame memory 281 (step S903).

In addition, the solid-state image pickup element 200 picks up the second image (step S904), and increases or decreases an image signal thereof using an analog gain (step S905). Then, the solid-state image pickup element 200 performs AD conversion of the increased or decreased image signal into a frame (step S906), and multiplies the frame by a gain ratio (step S907). Then, the solid-state image pickup element 200 adds a multiplication result to the first frame to generate long-time exposure data (step S908), and combines the second frame (short-time exposure data) and an addition result (long-time exposure data) (step S909).

Subsequently, the solid-state image pickup element 200 determines whether or not an end of image pickup has been instructed by a manipulation for ending image pickup or the like (step S910). In a case where an end of image pickup has not been instructed (step S910: No), the solid-state image pickup element 200 repeatedly executes steps subsequent to step S901. On the other hand, in a case where an end of image pickup has been instructed (step S910: Yes), the solid-state image pickup element 200 ends an operation for image pickup.

In this manner, according to the first embodiment of the present technology, because the second frame increased or decreased using the gain $Dg_S$ is added to the first frame after being multiplied by the gain ratio $Dg_L/Dg_S$, an exposure time can be prolonged, and an increase-decrease ratio for the second frame can be adjusted to a set $Dg_L$. A combined frame with an appropriate level that has been amplified using a set gain can be thereby generated.

Modified Example

In the above-described first embodiment, an image signal is amplified using an analog gain before AD conversion, but a value settable as an analog gain is restricted by the specification of an amplifier so as to fall within a certain range. Thus, in the amplification that uses an analog gain, a gain becomes insufficient in some cases. In this case, it is only required that amplification is further performed after AD conversion. A solid-state image pickup element 200 of a modified example of the first embodiment differs from that in the first embodiment in that the solid-state image pickup element 200 further performs amplification after AD conversion.

Figure 17:
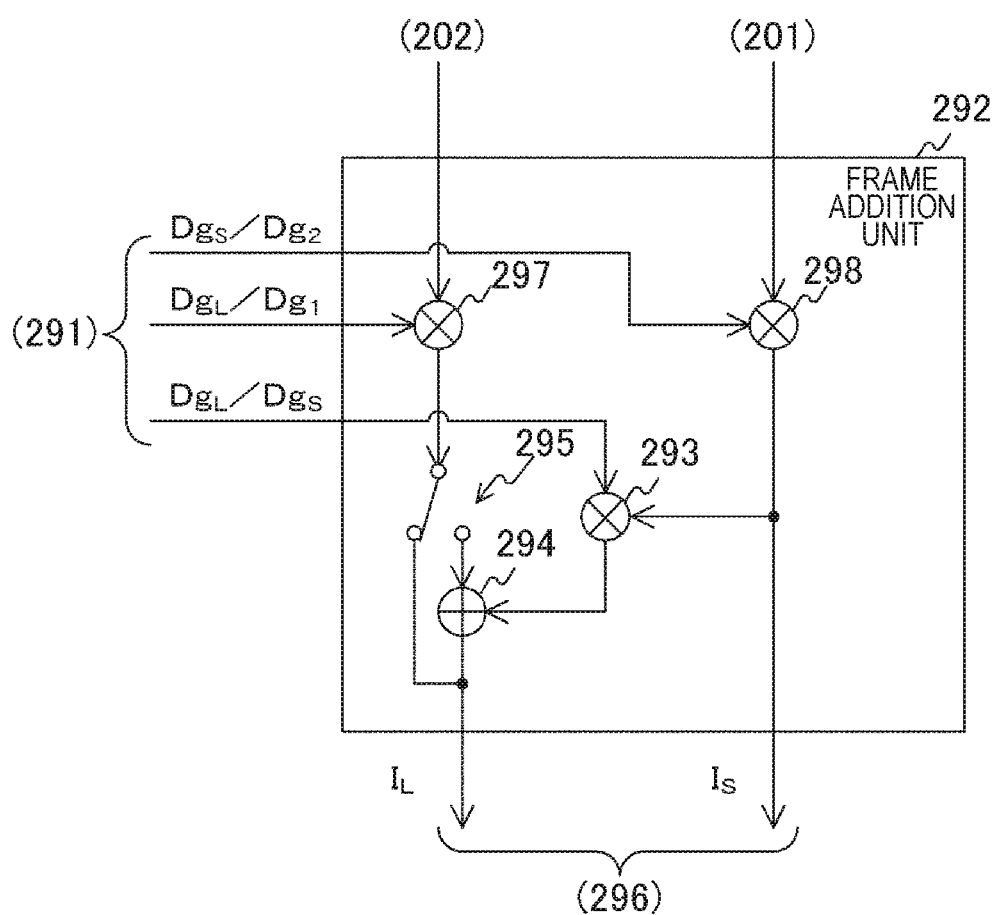

FIG. 17 is a diagram depicting a configuration example of a frame addition unit 292 in the modified example of the first embodiment. The frame addition unit 292 in the modified example of the first embodiment further includes multipliers 297 and 298.

The multiplier 297 multiplies the first frame from the middle layer substrate 202 by a gain ratio $Dg_L/Dg_L$. The multiplier 297 supplies a multiplication result to the switch 295. In addition, the multiplier 298 multiplies the second frame from the upper layer substrate 201 by a gain ratio $Dg_S/Dg_2$. The multiplier 298 supplies a multiplication result to the multiplier 293 and the HDR combining unit 296.

In a case where $Dg_L$ falls outside a gain range settable to an amplifier, the first frame is increased or decreased using an analog gain $Ag_1$ falling within the gain range that is closest to $Dg_L$. In this case, by multiplying a gain ratio between $Dg_L$ and $Dg_L$ corresponding to the analog gain $Ag_1$, by the multiplier 297, insufficiency of the gain can be compensated for.

In a similar manner, in a case where $Dg_S$ exceeds a gain range settable to an amplifier, the second frame is increased or decreased using an analog gain $Ag_2$ falling within the gain range that is closest to $Dg_S$. In this case, by multiplying a gain ratio between $Dg_2$ and $Dg_S$ corresponding to the analog gain $Ag_2$, by the multiplier 298, insufficiency of the gain can be compensated for.

In addition, also in cases such as a case where the user erroneously sets a gain, and a case where a gain for long-time exposure data is set as the digital gain $Dg_S$, correction can be performed by the multipliers 297 and 298.

In this manner, according to the modified example of the first embodiment of the present technology, because frames are increased or decreased using an analog gain, and the frames are further increased or decreased by the multipliers 297 and 298 after AD conversion, even in a case where an analog gain becomes insufficient, the insufficiency can be compensated for.

2. Second Embodiment

In the above-described first embodiment, two frames are combined to generate a combined frame, but there is concern that gradation fails to be sufficiently represented if the number of combined frames is two. Generally, as the number of frames to be combined is larger, a natural combined frame having smooth gradation can be generated. A solid-state image pickup element 200 of the second embodiment differs from that in the first embodiment in that three or more frames are combined.

Figure 18:
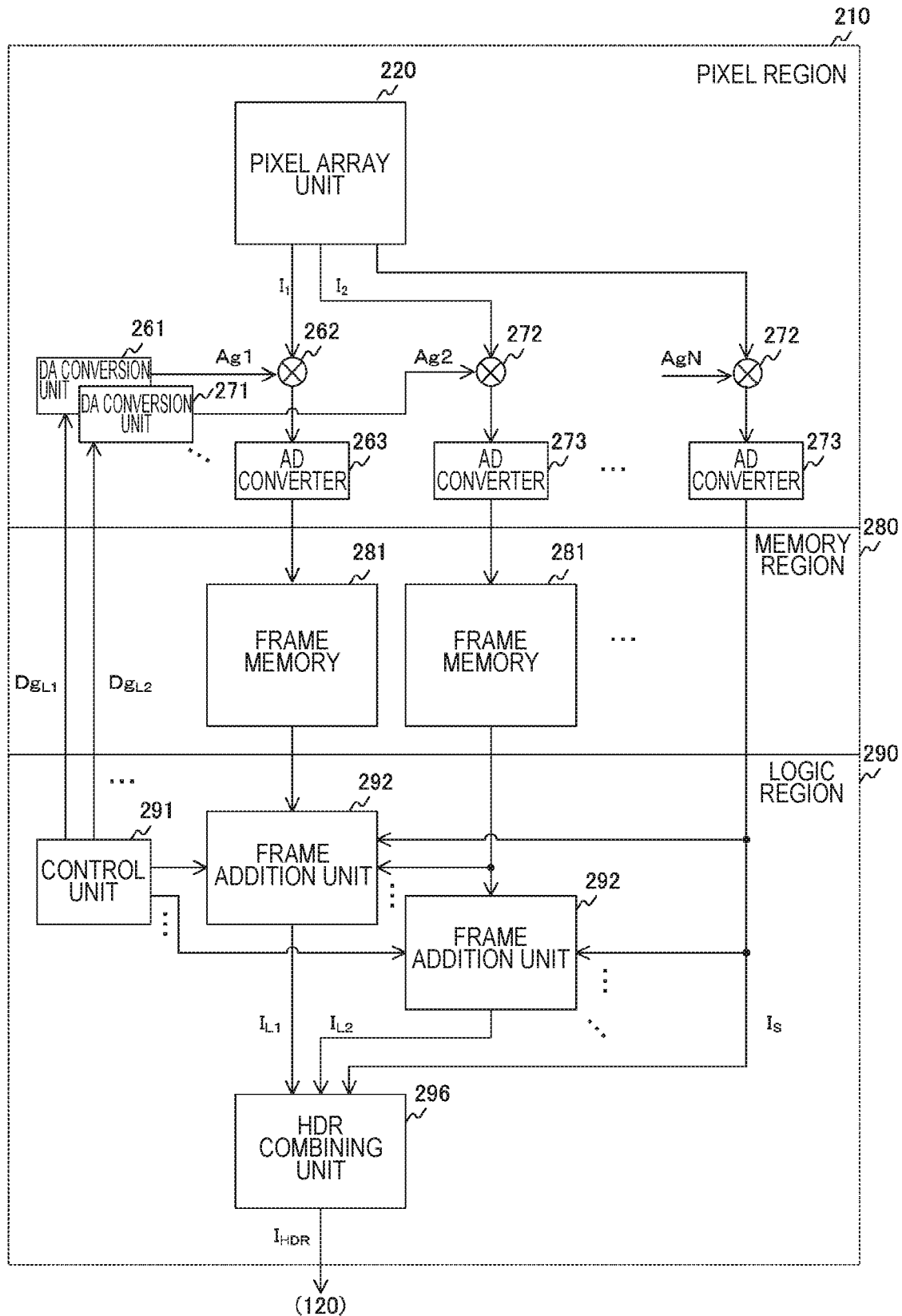

FIG. 18 is a diagram for describing a combining process of the solid-state image pickup element 200 in the second embodiment. The solid-state image pickup element 200 of the second embodiment combines three or more frames. In addition, in the logic region 290, frame addition units 292 are provided as many as the number smaller by one than the number of frames to be combined. For example, in a case where five frames are to be combined, four frame addition units 292 are provided. In addition, in the memory region 280, frame memories 281 are provided as many as the same number as the number of the frame addition units 292.

The number of frames to be combines is denoted by N, pixel data of the last frame is denoted as short-time exposure data $I_S$, and respective pieces of pixel data of the remaining (N−1) frames are denoted as long-time exposure data $I_{L1}$ to $I_{L(N-1)}$. In addition, a digital gain corresponding to the short-time exposure data $I_S$ is denoted by $Dg_S$, and digital gains corresponding to the long-time exposure data $I_{L1}$ to $IL_{N-1}$ are denoted by $Dg_{L1}$ to $Dg_{L(N-1)}$. In this case, pixel signals of first to (N−1)th images are increased or decreased using analog gains $Ag_1$ to $Ag_{N-1}$ obtained by converting the digital gains $Dg_{L1}$ to $Dg_{L(N-1)}$. In addition, a pixel signal of an Nth image is increased or decreased using an analog gain $Ag_N$ obtained by converting the digital gain $Dg_S$.

Then, first to (N−1)th frames are held in (N−1) frame memories 281. In addition, to the frame addition unit 292 corresponding to an n (n is an integer from 1 to N−1)th frame, nth to Nth frames are input. For example, to the frame addition unit 292 corresponding to the first frame, N frames in total from the first to Nth frames are input, and to the frame addition unit 292 corresponding to the second frame, (N−1) frames in total from the second to Nth frames are input.

In addition, in the frame addition unit 292 corresponding to the nth frame, pixel data in a k (k is an integer from (n+1) to N)th frame is multiplied by a gain ratio $Dg_{Ln}/Dg_k$. For example, in the frame addition unit 292 corresponding to the second frame, pixel data in a third frame is multiplied by a gain ratio $Dg_{L2}/Dg_3$.

Then, multiplication results and the nth frame are added, whereby long-time exposure data $I_{Ln}$ is generated. For example, in the frame addition unit 292 corresponding to the second frame, respective multiplication results corresponding to the third to Nth frames, and the second frame are added.

The above-described calculation is represented by the following formula.

$$I_{L1} = Ag_1 \times I_1 + \frac{Ag_2 \times I_2}{Dg_2} \times Dg_{L1} + \ldots + \frac{Ag_N \times I_N}{Dg_N} Dg_{L1} \quad \text{[Math. 1]}$$

$$= Dg_{L1}(I_1 + I_2 + \ldots + I_N)$$

$$I_{L2} = Ag_2 \times I_2 + \frac{Ag_3 \times I_3}{Dg_3} \times Dg_{L2} + \ldots + \frac{Ag_N \times I_N}{Dg_N} Dg_{L1}$$

$$= Dg_{L2}(I_2 + I_3 + \ldots + I_N)$$

$$\vdots$$

$$I_{L(N-1)} = Ag_{(N-1)} \times I_{(N-1)} + \frac{Ag_N \times I_N}{Dg_N} \times Dg_{L(N-1)}$$

$$= Dg_{L(N-1)}(I_{(N-1)} + I_N)$$

$$I_S = Ag_N \times I_N$$

$$= Dg_S \times I_N$$

Figure 19:
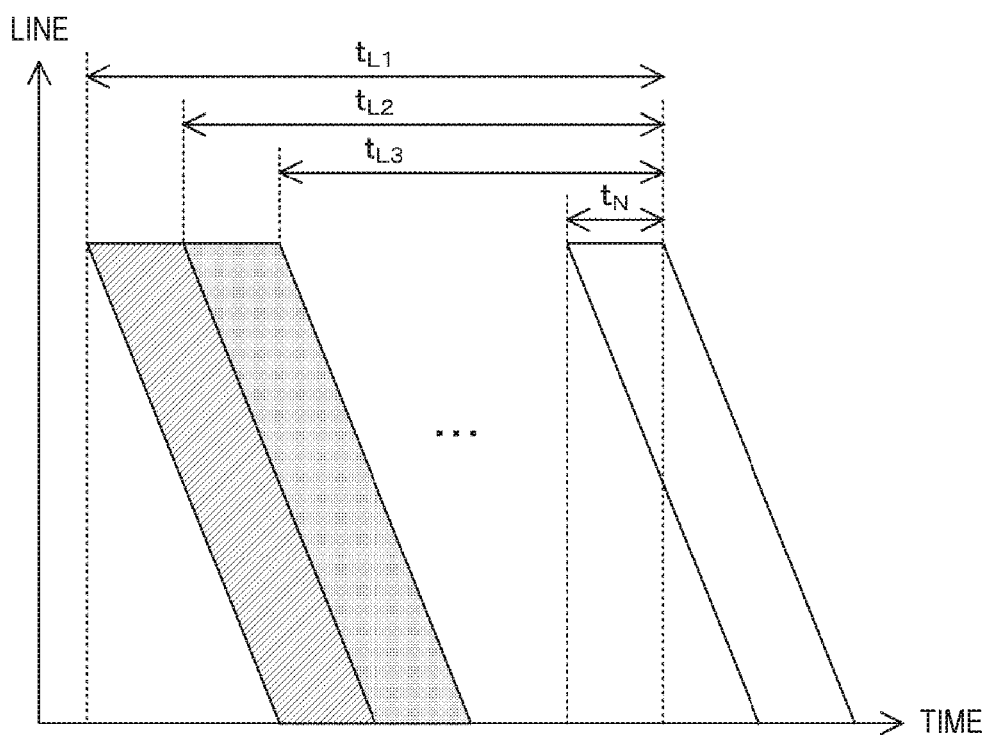

FIG. 19 is a diagram depicting an example of a driving timing of a pixel in the second embodiment. In the cycle $T_{VSYNC}$, N frames are sequentially generated. Then, by the addition of first to Nth frames, long-time exposure data having an exposure time $t_{L1}$ is generated. In addition, by the addition of second to Nth frames, long-time exposure data having an exposure time $t_{L2}$ is generated. Subsequently, in a similar manner, by addition of nth to Nth frames, long-time exposure data having an exposure time $t_{Ln}$ is generated. Then, the Nth frame is added to each piece of the long-time exposure data as short-time exposure data having an exposure time $t_N$.

In this manner, according to the second embodiment of the present technology, because three or more frames are combined, gradation can be made more smooth and image quality of a combined frame can be enhanced more than those in a case where two frames are combined.

<Example of Application to In-Vivo Information Acquisition System>

Figure 20:
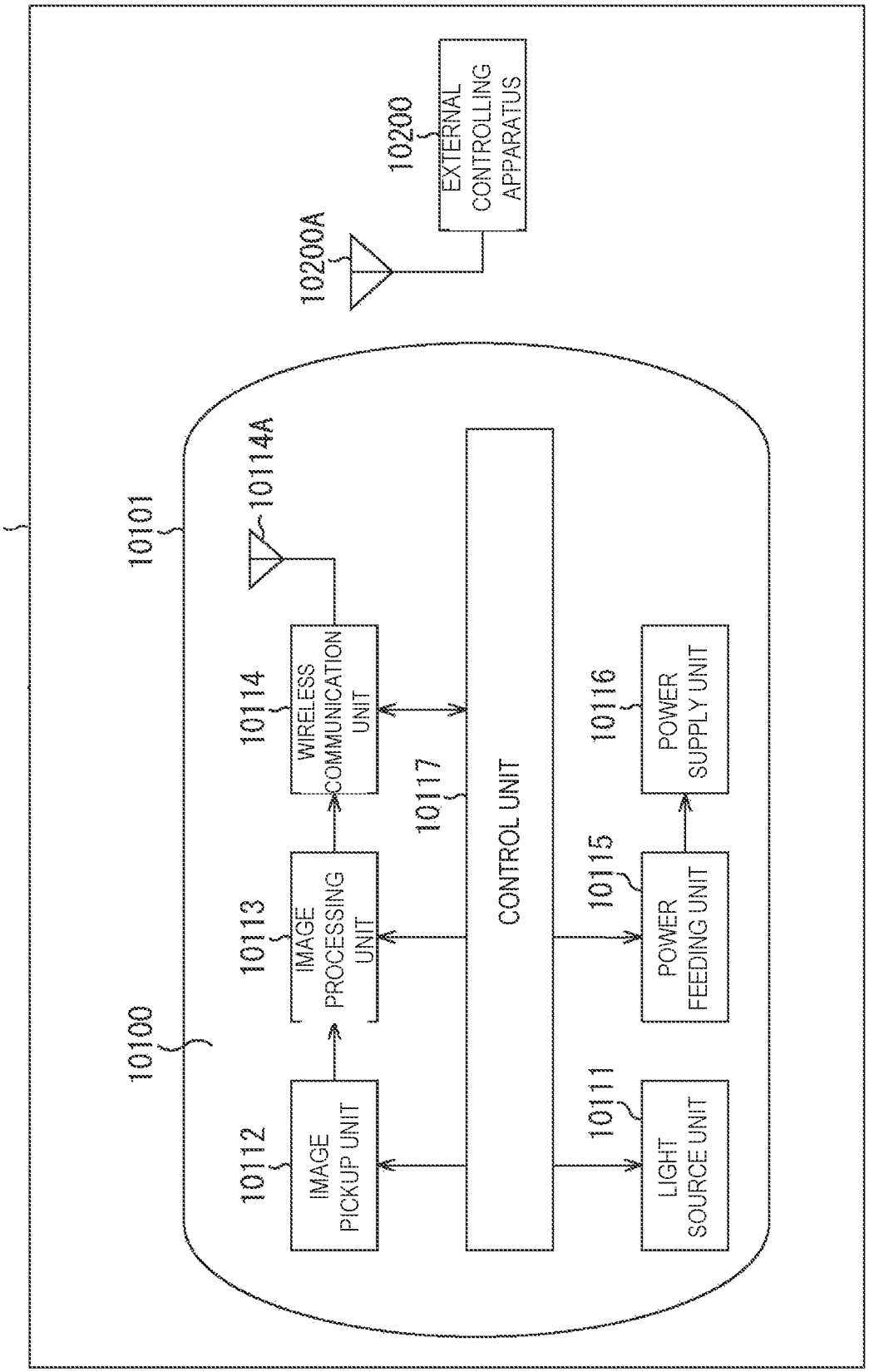

FIG. 20 is a block diagram depicting an example of a schematic configuration of an in-vivo information acquisition system of a patient using a capsule type endoscope, to which the technology according to an embodiment of the present disclosure (present technology) can be applied.

The in-vivo information acquisition system 10001 includes a capsule type endoscope 10100 and an external controlling apparatus 10200.

The capsule type endoscope 10100 is swallowed by a patient at the time of inspection. The capsule type endoscope 10100 has an image pickup function and a wireless communication function and successively picks up an image of the inside of an organ such as the stomach or an intestine (hereinafter referred to as in-vivo image) at predetermined intervals while it moves inside of the organ by peristaltic motion for a period of time until it is naturally discharged from the patient. Then, the capsule type endoscope 10100 successively transmits information of the in-vivo image to the external controlling apparatus 10200 outside the body by wireless transmission.

The external controlling apparatus 10200 integrally controls operation of the in-vivo information acquisition system 10001. Further, the external controlling apparatus 10200 receives information of an in-vivo image transmitted thereto from the capsule type endoscope 10100 and generates image data for displaying the in-vivo image on a display apparatus (not depicted) on the basis of the received information of the in-vivo image.

In the in-vivo information acquisition system 10001, an in-vivo image imaged a state of the inside of the body of a patient can be acquired at any time in this manner for a period of time until the capsule type endoscope 10100 is discharged after it is swallowed.

A configuration and functions of the capsule type endoscope 10100 and the external controlling apparatus 10200 are described in more detail below.

The capsule type endoscope 10100 includes a housing 10101 of the capsule type, in which a light source unit 10111, an image pickup unit 10112, an image processing unit 10113, a wireless communication unit 10114, a power feeding unit 10115, a power supply unit 10116 and a control unit 10117 are accommodated.

The light source unit 10111 includes a light source such as, for example, a light emitting diode (LED) and irradiates light on an image pickup field-of-view of the image pickup unit 10112.

The image pickup unit 10112 includes an image pickup element and an optical system including a plurality of lenses provided at a preceding stage to the image pickup element. Reflected light (hereinafter referred to as observation light) of light irradiated on a body tissue which is an observation target is condensed by the optical system and introduced into the image pickup element. In the image pickup unit 10112, the incident observation light is photoelectrically converted by the image pickup element, by which an image signal corresponding to the observation light is generated. The image signal generated by the image pickup unit 10112 is provided to the image processing unit 10113.

The image processing unit 10113 includes a processor such as a central processing unit (CPU) or a graphics processing unit (GPU) and performs various signal processes for an image signal generated by the image pickup unit 10112. The image processing unit 10113 provides the image signal for which the signal processes have been performed thereby as RAW data to the wireless communication unit 10114.

The wireless communication unit 10114 performs a predetermined process such as a modulation process for the image signal for which the signal processes have been performed by the image processing unit 10113 and transmits the resulting image signal to the external controlling apparatus 10200 through an antenna 10114A. Further, the wireless communication unit 10114 receives a control signal relating to driving control of the capsule type endoscope 10100 from the external controlling apparatus 10200 through the antenna 10114A. The wireless communication unit 10114 provides the control signal received from the external controlling apparatus 10200 to the control unit 10117.

The power feeding unit 10115 includes an antenna coil for power reception, a power regeneration circuit for regenerating electric power from current generated in the antenna coil, a voltage booster circuit and so forth. The power feeding unit 10115 generates electric power using the principle of non-contact charging.

The power supply unit 10116 includes a secondary battery and stores electric power generated by the power feeding unit 10115. In FIG. 20, in order to avoid complicated illustration, an arrow mark indicative of a supply destination of electric power from the power supply unit 10116 and so forth are omitted. However, electric power stored in the power supply unit 10116 is supplied to and can be used to drive the light source unit 10111, the image pickup unit 10112, the image processing unit 10113, the wireless communication unit 10114 and the control unit 10117.

The control unit 10117 includes a processor such as a CPU and suitably controls driving of the light source unit 10111, the image pickup unit 10112, the image processing unit 10113, the wireless communication unit 10114 and the power feeding unit 10115 in accordance with a control signal transmitted thereto from the external controlling apparatus 10200.

The external controlling apparatus 10200 includes a processor such as a CPU or a GPU, a microcomputer, a control board or the like in which a processor and a storage element such as a memory are mixedly incorporated. The external controlling apparatus 10200 transmits a control signal to the control unit 10117 of the capsule type endoscope 10100 through an antenna 10200A to control operation of the capsule type endoscope 10100. In the capsule type endoscope 10100, an irradiation condition of light upon an observation target of the light source unit 10111 can be changed, for example, in accordance with a control signal from the external controlling apparatus 10200. Further, an image pickup condition (for example, a frame rate, an exposure value or the like of the image pickup unit 10112) can be changed in accordance with a control signal from the external controlling apparatus 10200. Further, the substance of processing by the image processing unit 10113 or a condition for transmitting an image signal from the wireless communication unit 10114 (for example, a transmission interval, a transmission image number or the like) may be changed in accordance with a control signal from the external controlling apparatus 10200.

Further, the external controlling apparatus 10200 performs various image processes for an image signal transmitted thereto from the capsule type endoscope 10100 to generate image data for displaying a picked up in-vivo image on the display apparatus. As the image processes, various signal processes can be performed such as, for example, a development process (demosaic process), an image quality improving process (bandwidth enhancement process, a super-resolution process, a noise reduction (NR) process and/or image stabilization process) and/or an enlargement process (electronic zooming process). The external controlling apparatus 10200 controls driving of the display apparatus to cause the display apparatus to display a picked up in-vivo image on the basis of generated image data. Alternatively, the external controlling apparatus 10200 may also control a recording apparatus (not depicted) to record generated image data or control a printing apparatus (not depicted) to output generated image data by printing.

The example of the in-vivo information acquisition system to which the technology according to an embodiment of the present disclosure is applied has been described above. The technology according to an embodiment of the present disclosure can be applied to the image pickup unit 10112 among the above-described configurations. Because an exposure time can be prolonged by applying the technology according to the present disclosure to the image pickup unit 10112, an image can be made bright and accuracy of inspection can be enhanced.

<Example of Application to Mobile Object>

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

Figure 21:
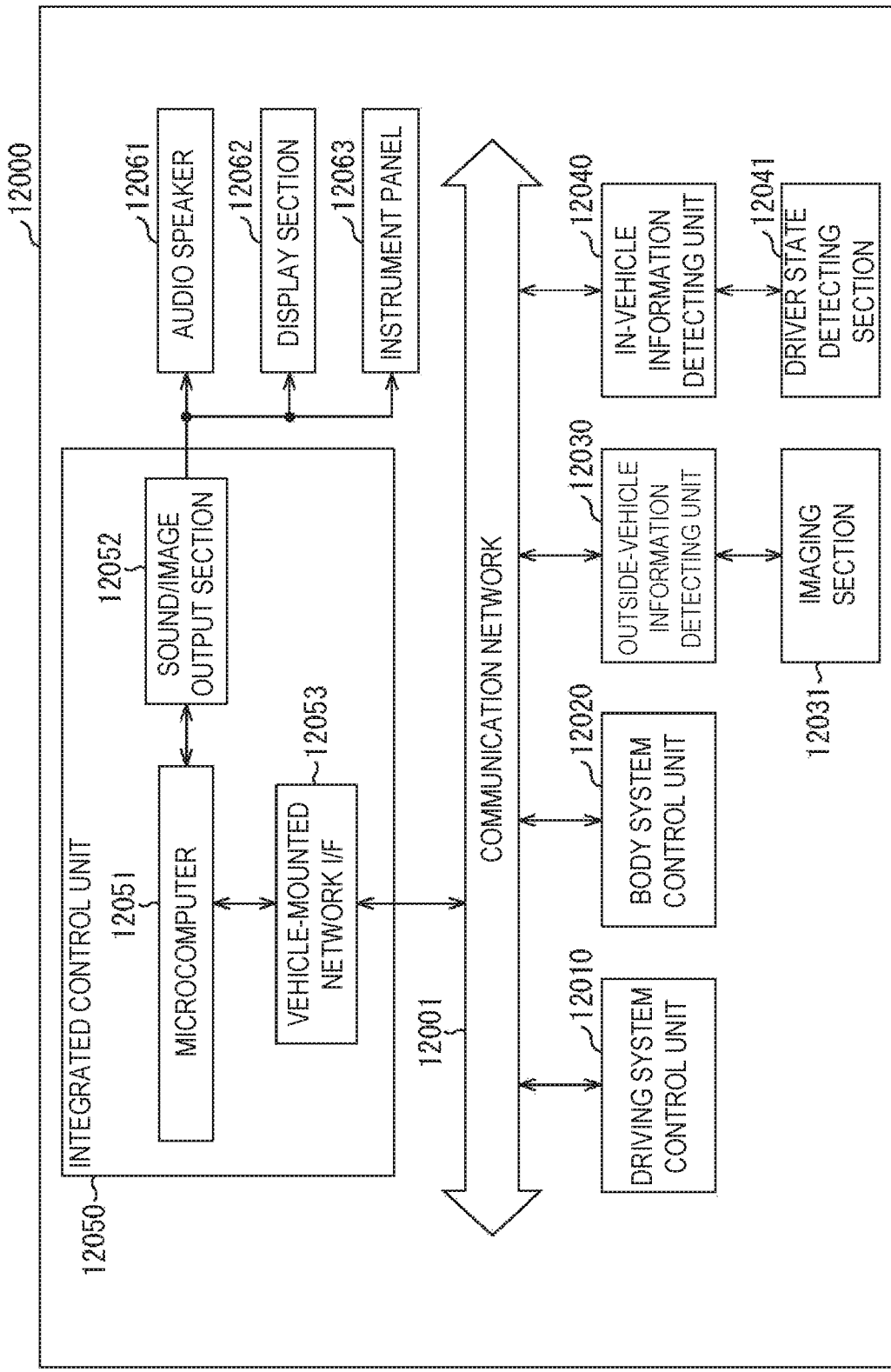
Figure 22:
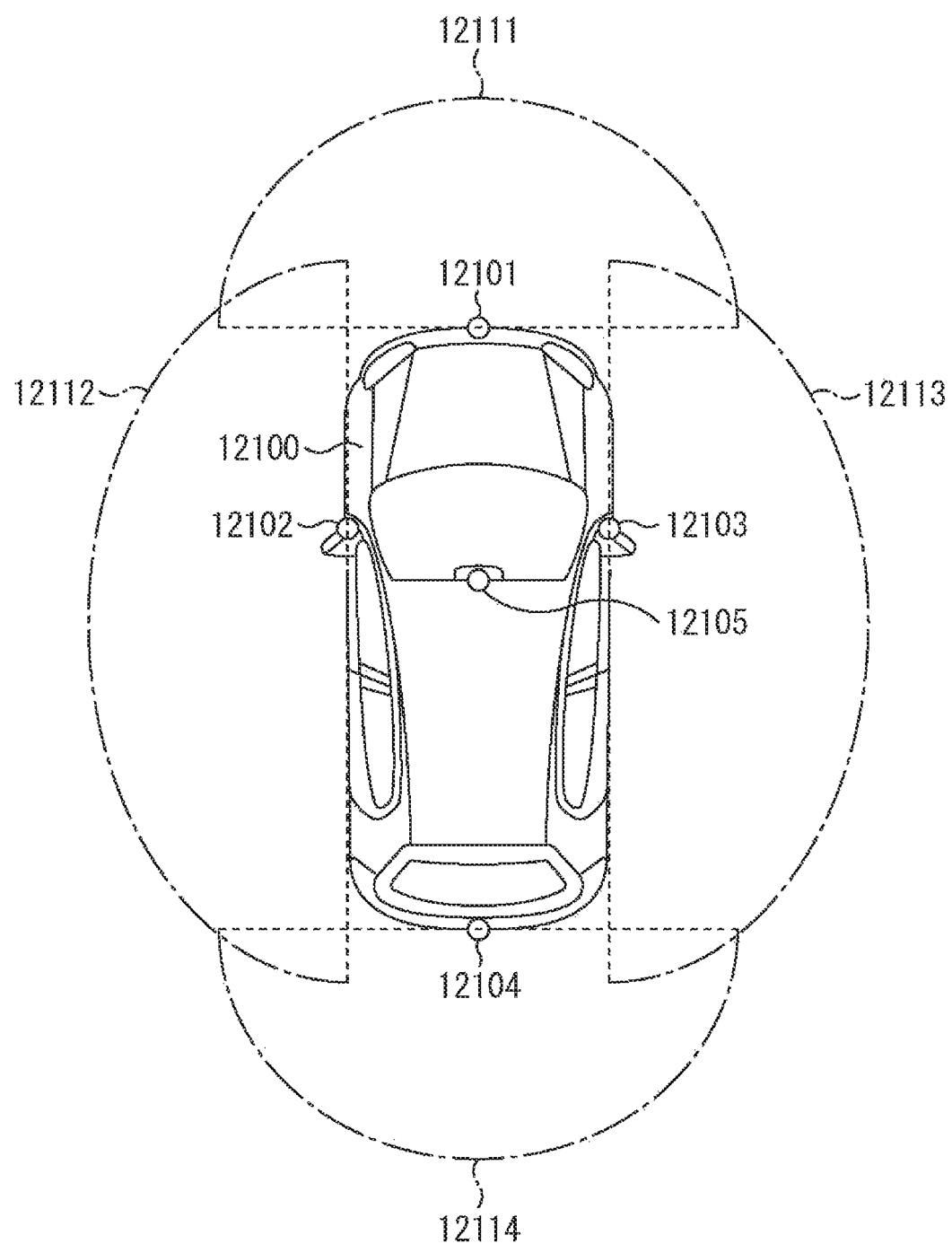

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display and a head-up display.

FIG. 1022 is a diagram depicting an example of the installation position of the imaging section 12031.

In FIG. 1022, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 1022 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to an embodiment of the present disclosure is applicable has been described above. The technology according to an embodiment of the present disclosure is applicable to the imaging section 12031 in the above-described configuration. Because an exposure time can be prolonged by applying the technology according to the present disclosure to the imaging section 12031, an image can be made bright and an easily viewable captured image can be obtained.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a CD (Compact Disc), an MD (MiniDisc), and a DVD (Digital Versatile Disc), a memory card, and a Blu-ray disc (registered trademark) can be used.

Note that the effects described in the present specification are not necessarily limited, and any effect described in the present disclosure may be exhibited.

Additionally, the present technology may also be configured as below.

(1)

A solid-state image pickup element including:

a gain processing unit configured to increase or decrease a plurality of image signals using gains different from each other;

an analog to digital conversion unit configured to generate a plurality of image data by performing analog to digital conversion on the increased or decreased plurality of image signals;

a calculation unit configured to add data obtained by multiplying short-time exposure data being any of the plurality of image data, by a ratio between the gains, and data among the plurality of image data that does not correspond to the short-time exposure data, and output the added data as long-time exposure data; and a combining unit configured to combine the short-time exposure data and the long-time exposure data at a predetermined combining ratio.

(2)

The solid-state image pickup element according to (1), further including:

a pixel array unit provided with a predetermined number of lines each including a plurality of pixels arrayed in a predetermined direction, in which the gain processing unit includes a first amplifier configured to increase or decrease a pixel signal from a specific line among the predetermined number of lines, using a first gain, and a second amplifier configured to increase or decrease a pixel signal from a line among the predetermined number of lines that does not correspond to the specific line, using a second gain.

(3)

The solid-state image pickup element according to (2), in which the analog to digital conversion unit includes a first analog to digital converter configured to generate first pixel data by performing analog to digital conversion on the pixel signal increased or decreased by the first amplifier, and a second analog to digital converter configured to generate first pixel data by performing analog to digital conversion on the pixel signal increased or decreased by the second amplifier.

(4)

The solid-state image pickup element according to (2) or (3), further including:

a driver configured to sequentially drive the predetermined number of lines to cause the pixel signal to be output, when a first exposure end time elapses, and to sequentially drive the predetermined number of lines to cause the pixel signal to be output, when a second exposure end time that is earlier than completion of an output of the predetermined number of lines elapses.

(5)

The solid-state image pickup element according to any of (1) to (4), in which the plurality of image signals include first and second image signals, the gain processing unit increases or decreases the first image signal using a first gain, and increases or decreases the second image signal using a second gain, the analog to digital conversion unit generates first and second image data by performing analog to digital conversion on the first and second image signals, and the calculation unit adds data obtained by multiplying the short-time exposure data by a ratio of the second gain with respect to the first gain, using the second image data as the short-time exposure data, and the first image data, and outputs the added data as the long-time exposure data.

(6)

The solid-state image pickup element according to any of (1) to (5), in which the plurality of image signals include image signals larger in number than two, the combining unit combines a predetermined number of the long-time exposure data and the short-time exposure data, the predetermined number being smaller by one than the number of the plurality of image signals, and the calculation unit performs, the predetermined number of times, a process of adding data obtained by multiplying any of a certain number of the image data by the ratio between the gains, the certain number not exceeding the predetermined number, and data obtained by multiplying remaining image data of the certain number of image data by the ratio between the gains, and outputting the added data as any of the predetermined number of long-time image data.

(7)

The solid-state image pickup element according to any of (1) to (6), in which the calculation unit includes
a multiplication unit configured to multiply each piece of the plurality of image data by a predetermined value, and
a long-time data calculation unit configured to add data obtained by multiplying the multiplied short-time exposure data by the ratio between the gains, and data among the multiplied plurality of image data that does not correspond to the short-time exposure data, and output the added data as the long-time exposure data.

(8)

An image pickup apparatus including:
a gain processing unit configured to increase or decrease a plurality of image signals using gains different from each other;
an analog to digital conversion unit configured to generate a plurality of image data by performing analog to digital conversion on the increased or decreased plurality of image signals;
a calculation unit configured to add data obtained by multiplying short-time exposure data being any of the plurality of image data, by a ratio between the gains, and data among the plurality of image data that does not correspond to the short-time exposure data, and output the added data as long-time exposure data;
a combining unit configured to combine the short-time exposure data and the long-time exposure data at a predetermined combining ratio, and output the added data as a combined frame; and
a digital signal processing unit configured to execute predetermined digital signal processing on the combined frame.

(9)

A control method of a solid-state image pickup element, the control method including:
a gain processing procedure of increasing or decreasing a plurality of image signals using gains different from each other;
an analog to digital conversion procedure of generating a plurality of image data by performing analog to digital conversion on the increased or decreased plurality of image signals;
a calculation procedure of adding data obtained by multiplying short-time exposure data being any of the plurality of image data, by a ratio between the gains, and data among the plurality of image data that does not correspond to the short-time exposure data, and outputting the added data as long-time exposure data; and
a combining procedure of combining the short-time exposure data and the long-time exposure data at a predetermined combining ratio.

REFERENCE SIGNS LIST 100 image pickup apparatus
110 optical unit
120 DSP circuit
130 display unit
140 manipulation unit
150 bus
160 power supply unit
170 recording unit
180, 281 frame memory
200 solid-state image pickup element
201 upper layer substrate
202 middle layer substrate
203 lower layer substrate
210 pixel region
211, 213 ramp signal generation unit
212 driver
220 pixel array unit
230 pixel block
231, 232, 235, 236, 239, 240, 243, 244 transfer transistor
233, 234, 237, 238, 241, 242, 245, 246 photoelectric conversion element
247 reset transistor
248 floating diffusion layer
249 amplification transistor
250 selection transistor
260, 270 signal processing unit
261, 271 DA conversion unit
262, 272 amplifier
263, 273 AD converter
264, 274 comparator
265, 275 counter
266, 276, 295 switch
280 memory region
290 logic region
291 control unit
292 frame addition unit
293, 297, 298 multiplier
294 adder
296 HDR combining unit

The invention claimed is:

1. A solid-state image pickup element comprising:
a gain processing unit configured to increase or decrease a plurality of image signals using gains different from each other;
an analog to digital conversion unit configured to generate a plurality of image data by performing analog to digital conversion on the increased or decreased plurality of image signals;
a calculation unit configured to add data obtained by multiplying short-time exposure data being any of the plurality of image data, by a ratio between the gains, and data among the plurality of image data that does not correspond to the short-time exposure data, and output the added data as long-time exposure data; and
a combining unit configured to combine the short-time exposure data and the long-time exposure data at a predetermined combining ratio.

2. The solid-state image pickup element according to claim 1, further comprising:
a pixel array unit provided with a predetermined number of lines each including a plurality of pixels arrayed in a predetermined direction,
wherein the gain processing unit includes
a first amplifier configured to increase or decrease a pixel signal from a specific line among the predetermined number of lines, using a first gain, and
a second amplifier configured to increase or decrease a pixel signal from a line among the predetermined number of lines that does not correspond to the specific line, using a second gain.

3. The solid-state image pickup element according to claim 2, wherein the analog to digital conversion unit includes
a first analog to digital converter configured to generate first pixel data by performing analog to digital conversion on the pixel signal increased or decreased by the first amplifier, and a second analog to digital converter configured to generate second pixel data by performing analog to digital conversion on the pixel signal increased or decreased by the second amplifier.

4. The solid-state image pickup element according to claim 2, further comprising:
a driver configured to sequentially drive the predetermined number of lines to cause the pixel signal to be output, when a first exposure end time elapses, and to sequentially drive the predetermined number of lines to cause the pixel signal to be output, when a second exposure end time that is earlier than completion of an output of the predetermined number of lines elapses.

5. The solid-state image pickup element according to claim 1, wherein the plurality of image signals include first and second image signals,
the gain processing unit increases or decreases the first image signal using a first gain, and increases or decreases the second image signal using a second gain,
the analog to digital conversion unit generates first and second image data by performing analog to digital conversion on the first and second image signals, and
the calculation unit adds data obtained by multiplying the short-time exposure data by a ratio of the second gain with respect to the first gain, using the second image data as the short-time exposure data, and the first image data, and outputs the added data as the long-time exposure data.

6. The solid-state image pickup element according to claim 1, wherein the plurality of image signals include image signals larger in number than two,
the combining unit combines a predetermined number of the long-time exposure data and the short-time exposure data, the predetermined number being smaller by one than a number of the plurality of image signals, and
the calculation unit performs, the predetermined number of times, a process of adding data obtained by multiplying any of a certain number of the image data by the ratio between the gains, the certain number not exceeding the predetermined number, and data obtained by multiplying remaining image data of the certain number of image data by the ratio between the gains, and outputting the added data as any of the predetermined number of long-time image data.

7. The solid-state image pickup element according to claim 1, wherein the calculation unit includes
a multiplication unit configured to multiply each piece of the plurality of image data by a predetermined value, and a long-time data calculation unit configured to add data obtained by multiplying the multiplied short-time exposure data by the ratio between the gains, and data among the multiplied plurality of image data that does not correspond to the short-time exposure data, and output the added data as the long-time exposure data.

8. An image pickup apparatus comprising:
a gain processing unit configured to increase or decrease a plurality of image signals using gains different from each other;
an analog to digital conversion unit configured to generate a plurality of image data by performing analog to digital conversion on the increased or decreased plurality of image signals;
a calculation unit configured to add data obtained by multiplying short-time exposure data being any of the plurality of image data, by a ratio between the gains, and data among the plurality of image data that does not correspond to the short-time exposure data, and output the added data as long-time exposure data;
a combining unit configured to combine the short-time exposure data and the long-time exposure data at a predetermined combining ratio, and output the added data as a combined frame; and
a digital signal processing unit configured to execute predetermined digital signal processing on the combined frame.

9. A control method of a solid-state image pickup element, the control method comprising:
a gain processing procedure of increasing or decreasing a plurality of image signals using gains different from each other;
an analog to digital conversion procedure of generating a plurality of image data by performing analog to digital conversion on the increased or decreased plurality of image signals;
a calculation procedure of adding data obtained by multiplying short-time exposure data being any of the plurality of image data, by a ratio between the gains, and data among the plurality of image data that does not correspond to the short-time exposure data, and outputting the added data as long-time exposure data; and
a combining procedure of combining the short-time exposure data and the long-time exposure data at a predetermined combining ratio.

* * * * *